(12) United States Patent
Liu

(10) Patent No.: US 10,033,496 B2
(45) Date of Patent: Jul. 24, 2018

(54) METHODS USED IN SERVING RADIO NODE AND CONTROL NODE, AND ASSOCIATED DEVICES

(71) Applicant: Telefonaktiebolaget LM Ericsson (publ), Stockholm (SE)

(72) Inventor: Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 74 days.

(21) Appl. No.: 15/028,620

(22) PCT Filed: Jun. 26, 2015

(86) PCT No.: PCT/CN2015/082516
§ 371 (c)(1),
(2) Date: Apr. 11, 2016

(87) PCT Pub. No.: WO2016/206103
PCT Pub. Date: Dec. 29, 2016

(65) Prior Publication Data
US 2017/0180092 A1 Jun. 22, 2017

(51) Int. Cl.
*H04W 4/00* (2018.01)
*H04L 5/00* (2006.01)
*H04W 72/04* (2009.01)

(52) U.S. Cl.
CPC .......... *H04L 5/0048* (2013.01); *H04L 5/0032* (2013.01); *H04W 72/0446* (2013.01)

(58) Field of Classification Search
CPC . H04L 5/0032; H04L 5/0048; H04W 72/0446
See application file for complete search history.

(56) References Cited

U.S. PATENT DOCUMENTS

| 2012/0015664 A1* | 1/2012 | Han | H04W 72/082 |
| | | | 455/452.1 |
| 2012/0033571 A1* | 2/2012 | Shimezawa | H04B 7/026 |
| | | | 370/252 |
| 2017/0111914 A1* | 4/2017 | Chen | H04W 72/10 |

FOREIGN PATENT DOCUMENTS

| CN | 102611527 A | 7/2012 |
| CN | 103563409 A | 2/2014 |

(Continued)

OTHER PUBLICATIONS

Notification of Transmittal of the International Search Report and the Written Opinion for Application No. PCT/CN2016/087045, dated Aug. 29, 2016, 11 pages.

(Continued)

*Primary Examiner* — Kan Yuen
(74) *Attorney, Agent, or Firm* — NDWE LLP

(57) ABSTRACT

A method used in a serving radio node and an associated serving radio node. The method includes receiving, from a control node controlling the serving radio node, a sounding and sensing related configuration for the serving radio node, wherein each sounding resource element indicated by the sounding and sensing related configuration is orthogonal to each sounding resource element indicated by a sounding and sensing related configuration for each neighboring radio node; and sensing, through a Receiver (RX) Radio Frequency (RF) chain of the serving radio node configured for each radio link of the one or more radio links, all sounding signals in a direction of the radio link based on the received sounding and sensing related configuration. Further methods described are used in a serving radio node, an associated serving radio node, and in a control node to control the serving radio node and the associated control node.

30 Claims, 12 Drawing Sheets

(56) References Cited

FOREIGN PATENT DOCUMENTS

| WO | 2012167184 A2 | 12/2012 |
| WO | 2014036150 A1 | 3/2014 |
| WO | 2014133311 A1 | 9/2014 |

OTHER PUBLICATIONS

Notification of Transmittal of the International Search Report and the Written Opinion for Application No. PCT/CN2015/082516, dated Mar. 24, 2016, 11 pages.

\* cited by examiner

METHODS USED IN SERVING RADIO NODE AND CONTROL NODE, AND ASSOCIATED DEVICES

CROSS-REFERENCE TO RELATED APPLICATIONS

This application is a National stage of International Application No. PCT/CN2015/082516, filed Jun. 26, 2015, which is hereby incorporated by reference.

TECHNICAL FIELD

The technology presented in this disclosure generally relates to the technical field of wireless communication networks. More particularly, the present disclosure relates to methods used in a serving radio node and the associated serving radio node, and to a method used in a control node controlling a serving radio node and the associated control node.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Currently, wireless communication networks or systems, such as MilliMeter-Wave (MMW) wireless systems, operating at high frequencies from 30-300 GHz, are emerging as a promising technology to meet exploding bandwidth requirements by enabling multi-Gb/s speeds. For example, the 5th Generation (5G) network is likely to be a combination of evolved 3rd Generation (3G) technologies, the 4th Generation (4G) technologies and emerging or substantially new components such as Ultra-Density Network (UDN), which is also referred to as MMW Radio Access Technology (RAT). At such high frequencies, a large number of antennas can be available at a transmitter, a receiver, or both. In order to make up for the large propagation loss that typically occurs, beam-forming becomes a very important feature in MMW wireless systems.

Beam-forming is a signal processing technique used for directional signal transmission and/or reception. For Transmitter (TX) beamforming, the signals are concentrated in the desired direction via applying a selected precoding vector for the TX antenna array. For Receiver (RX) beamforming, the RX beam of the receiver antennas are concentrated in the incoming direction of the radio signals by applying a selected precoding vector for the RX antenna array. Beam-forming can be used at both the transmitting and receiving ends in order to achieve spatial selectivity. The improvement compared with omnidirectional reception/transmission is known as a beam-forming gain. When multiple antennas are available at transmitters, receivers or both, it is therefore important to apply efficient beam patterns to the antennas to better exploit the spatial selectivity of the corresponding wireless channel.

FIG. 1 schematically shows one example MMW RAT network. As shown in FIG. 1, there is a network node or a control node called as Central Control Unit (CCU), which is at least responsible for parameter configurations and coordination among Access Nodes (ANs), e.g., AN1, AN2, AN3, and AN4.

Typically, received power in a receiver side can be expressed as:

$$P_{rx} = P_{TX} \cdot G_{TX} \cdot G_{RX} \left(\frac{r}{4\pi\lambda}\right)^2 \cdot e^{-\alpha r}$$

where $P_{TX}$ is transmitted power, $G_{TX}$ and $G_{RX}$ are beamforming gains of transmitting and receiving antennas, respectively, $\lambda$ is the wavelength, and a is the attenuation factor due to absorption in the medium. For an MMW-wave link at 60 GHz, oxygen absorption loss can be as high as 16 dB/km.

From the above formula, it is clear that the attenuation of radio wave is proportional to $1/\lambda^2$. With the same propagation distance, 60 GHz attenuates 29.5 dB more compared to 2 GHz, without considering the oxygen absorption.

In considering this, high gain beam-forming is mandatory in order to compensate the extra attenuation. Thanks to the small wavelength, more antenna elements can be integrated in the antenna panel with the same size. This makes it possible to reach a higher beam-forming gain. However, if there are several tens or several hundreds of antenna elements, one Radio Frequency (RF) chain (either TX RF chain or RX RF chain) for each antenna element is inapplicable due to unacceptable cost. In such a case, multiple antenna elements share one RF chain and a specific analog phase adjustment is applied for each antenna in order to adjust the beam direction and maximize the beam-forming gain. Due to the narrow TX beam, it is needed to steer transmission of beacon signals to enable AN discovery area, and to preform beam-forming training to maximize the beam-forming gain.

Meanwhile, high gain beam-forming could bring challenges, including, e.g., hidden problem and deafness problem.

FIG. 2 illustrates an example of the hidden problem caused by directivity of high gain beam-forming. As shown in FIG. 2, link pair 1 is composed by Access Point 1 (AP1) and User Equipment 1 (UE1), and link pair 2 is composed by AP2 and UE2. When AP2 is transmitting to UE2, neither AP 1 or UE 1 can detect the channel utilized by AP2 and UE2 because both AP1 and UE1 are outside of the TX beam coverage from AP2 to UE2. However, when AP1 transmits data to UE1, its TX beam can reach UE2 and cause interference.

FIG. 3 illustrates an example of the deafness problem caused by directivity of high gain beam-forming. As shown in FIG. 3, UE 1 and AP1 compose link pair 1 and UE2 and AP2 compose link pair 2. The link pair 2 has ongoing data transmission from AP2 to UE2. But this is not detected by UE1 because UE1 does not monitor (or sense) this direction. However, when UE 1 starts data transmission, the data receiving by UE2 can be clearly impacted due to UE1 and UE2 are close to each other.

Currently, it is supposed that the total carrier bandwidth of the MMW-RAT can be up to 1 or 2 GHz. This bandwidth can be composed by a number of sub-band carriers of a certain bandwidth, e.g. 100 MHz. By way of example, FIG. 4 illustrates one MMW-RAT carrier with 4 sub-bands. The smallest resource grid in FIG. 4 corresponds to a sub-band in the frequency domain and to a subframe in the time domain, and may be referred to as a sounding and sensing resource element. Of course, the sounding and sensing resource element may be also in terms of code.

To allocate the available resources, a contention based resource allocation scheme and/or a scheduling based resource allocation scheme may be applied in MMW-RAT as the basic policy of collision avoidance. A contention based resource allocation scheme provides a mechanism to compete for the channel based on the self-determination on the channel availability. In a scheduling based resource allocation scheme, a scheduler, e.g., a CCU as shown in FIG. 1, gains the resource controllability first via either contention based method or coordination method first and allocates the resource to controlled links.

There could be certain combination of the contention based resource allocation scheme and the scheduling based resource allocation scheme. FIG. 5 illustrates an example of a complex interference situation in a MMW-RAT network. As shown in FIG. 5, due to directivity of high gain beam-forming, Link 1 and Link 2 may have unendurable UpLink (UL) to DownLink (DL) interference while Link 5 and Link 6 may have unendurable DL to DL interference and UL to DL interference.

Due to directivity of high gain beam-forming, the collision determination is more complex than omni-transmission. The traditional measurement does not work well due to the aforementioned deafness and hidden problems. Besides, though carrier sensing methods commercially used in Wireless Local Area Network (WLAN, 802.11) and Wireless Personal Area Network (WPAN, 802.15) are developed, they are mainly for local access system. It is a distributed carrier sensing scheme, i.e., the carrier sensing is done by each node pair independently. For MMW RAT, firstly it is expected that there can be better dimensioned deployment involving multiple nodes of APs and UEs, and better network controllability (e.g., self-optimization, self-organization, and mobility) than Wireless Fidelity (WiFi) is targeted. Secondly, MMW RAT is expected to provide much better Quality of Service (QoS) than WiFi. In this sense, a better measurement than simple distributed carrier sensing of WiFi is desired.

The interference measurements in 3G and 4G wireless systems are mainly designed to measure the inter-cell/inter-Transmission-Point interference, rather than inter-link interference. Due to small sector size and the large overlapping coverage in case of MMW RAT, the similar measurement as 3G or 4G systems is not enough to identify links in collision and help the interference management.

SUMMARY

It is in view of the above considerations and others that the various embodiments of the present technology have been made. To be specific, aiming to at least some of the above defects, the present disclosure proposes to configure neighboring radio nodes under control of one CCU with different sounding and sensing related configurations, thereby facilitating interference measurements.

According to a first aspect of the present disclosure, there is proposed a method used in a serving radio node. The serving radio node serves one or more client radio nodes which are connected to the serving radio node via one or more radio links, in a coverage area neighboring to one or more coverage areas served by one or more neighboring radio nodes in a wireless communication network. The method includes receiving, from a control node controlling the serving radio node, a sounding and sensing related configuration for the serving radio node. Each sounding resource element indicated by the sounding and sensing related configuration is orthogonal to each sounding resource element indicated by a sounding and sensing related configuration for each neighboring radio node. The method further includes sensing, through a RX RF chain of the serving radio node configured for each radio link of the one or more radio links, all sounding signals in a direction of the radio link based on the received sounding and sensing related configuration.

Preferably, the received sounding and sensing related configuration indicates two or more sounding and sensing windows per sounding and sensing duration, one or more sounding and sensing windows of which are configured as sensing windows for sensing by the serving radio node, and the remaining sounding and sensing windows of which are configured as sounding windows for sounding by the serving radio node.

Preferably, the sounding windows for the serving radio node correspond, in time domain, to sensing windows for each neighboring radio node.

Preferably, each sounding and sensing window has a same or different number of sounding and sensing resource elements.

Preferably, each sounding and sensing window has consecutive or non-consecutive sounding and sensing resource elements.

Preferably, the method further includes allocating one or more sounding and sensing resource elements indicated by the received sounding and sensing related configuration, to the one or more radio links.

Preferably, the sensing is performed in all sensing resource elements indicated by the received sounding and sensing related configuration.

Preferably, the sensing is further performed in a part or all sounding resource elements indicated by the received sounding and sensing related configuration.

Preferably, the method further includes: adjusting a sensing period for each radio link of the one or more radio links based on the received sounding and sensing related configuration and one or more predefined parameters, when the number of RX RF chains of the serving radio node is smaller than the number of all radio links for which the serving node serves as receivers; sensing, through a RX RF chain of the serving radio node configured for each radio link of the one or more radio links, all sounding signals in a direction of the radio link, based on the adjusted sensing period.

Preferably, the one or more predefined parameters include at least one of: a link radio quality; a link rate; or a link traffic priority.

According to a second aspect of the present disclosure, there is proposed a method used in a control node controlling a serving radio node. The serving radio node serves one or more client radio nodes which are connected to the serving radio node via one or more radio links, in a coverage area neighboring to one or more coverage areas served by one or more neighboring radio nodes in a wireless communication network. The method includes: determining a sounding and sensing related configuration for the serving radio node, wherein the sounding resource element indicated by the sounding and sensing related configuration for the serving radio node is orthogonal to each sounding resource element indicated by a sounding and sensing related configuration for each neighboring radio node; and transmitting the determined sounding and sensing related configuration to the serving radio node.

According to a third aspect of the present disclosure, there is proposed a method used in a serving radio node. The serving radio node serves one or more client radio nodes which are connected to the serving radio node via one or more radio links, in a coverage area neighboring to one or more coverage areas served by one or more neighboring radio nodes in a wireless communication network. The method includes: receiving, from a control node controlling the serving radio node, a sounding and sensing related configuration for the serving radio node; adjusting a sensing period for each radio link of the one or more radio links based on the sounding and sensing related configuration and one or more predefined parameters, when the number of RX RF chains of the serving radio node is smaller than the number of the one or more radio links for which the serving node serves as receivers; and sensing, through a RX RF chain of the serving radio node configured for each radio link of the one or more radio links, all sounding signals in a direction of the radio link, based on the adjusted sensing period.

According to a fourth aspect of the present disclosure, there is proposed a serving radio node, which serves one or more client radio nodes which are connected to the serving radio node via one or more radio links, in a coverage area neighboring to one or more coverage areas served by one or more neighboring radio nodes in a wireless communication network. The serving radio node includes: a receiving unit configured to receive, from a control node controlling the serving radio node, a sounding and sensing related configuration for the serving radio node, wherein each sounding resource element indicated by the sounding and sensing related configuration is orthogonal to each sounding resource element indicated by a sounding and sensing related configuration for each neighboring radio node; and a sensing unit configured to sense, through a RX RF chain of the serving radio node configured for each radio link of the one or more radio links, all sounding signals in a direction of the radio link, based on the received sounding and sensing related configuration.

According to a fifth aspect of the present disclosure, there is proposed a control node controlling a serving radio node. The serving radio node serves one or more client radio nodes which are connected to the serving radio node via one or more radio links, in a coverage area neighboring to one or more coverage areas served by one or more neighboring radio nodes in a wireless communication network. The control node includes: a determining unit configured to determine a sounding and sensing related configuration for the serving radio node, wherein the sounding resource element indicated by the sounding and sensing related configuration for the serving radio node is orthogonal to each sounding resource element indicated by a sounding and sensing related configuration for each neighboring radio node; and a transmitting unit configured to transmit the determined sounding and sensing related configuration to the serving radio node.

According to a sixth aspect of the present disclosure, there is proposed a serving radio node, which serves one or more client radio nodes which are connected to the serving radio node via one or more radio links, in a coverage area neighboring to one or more coverage areas served by one or more neighboring radio nodes in a wireless communication network. The serving radio node includes: a receiving unit configured to receive, from a control node controlling the serving radio node, a sounding and sensing related configuration for the serving radio node; an adjusting unit configured to adjust a sensing period for each radio link of the one or more radio links based on the sounding and sensing related configuration and one or more predefined parameters, when the number of RX RF chains of the serving radio node is smaller than the number of the one or more radio links for which the serving node serves as receivers; and a sensing unit configured to sense, through a RX RF chain of the serving radio node configured for each radio link of the one or more radio links, all sounding signals in a direction of the radio link, based on the adjusted sensing period.

According to a seventh aspect of the present disclosure, there is proposed a computer program product storing instructions that when executed, cause one or more computing devices to perform the method of any of the first to the third aspects.

According to the present disclosure, neighboring radio nodes under the control of one CCU are configured with different sounding and sensing related configurations, in such a manner that each sounding resource element indicated by one radio node's sounding and sensing related configuration is orthogonal to each sounding resource element indicated by a sounding and sensing related configuration for each of its neighboring radio node. In this case, a TX RF chain of a radio node is configured with a resource element for transmitting sounding signals in its link direction, and correspondingly, a RX RF chain of the radio node's neighboring node is configured with the same resource element for sensing (monitoring) all possible sounding signals in its link direction. That is, when a radio node is in a directional sounding state (i.e., in TX state), each neighboring radio node should be sensing directional sounding signals (i.e., in RX state). This facilitates interference measurement, while improving interference measurement accuracy.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

First of all, the present disclosure proposes to align directional sounding and sensing parameters (this solution may be referred to as Aligned Directional Sounding and Sensing (ADSS) hereinafter), e.g., in an MMW RAT network. To be specific, the present disclosure configures a transmitter of each link pair (i.e., link transmitter and receiver) with a time-frequency radio resource pattern to send directional sounding beam in its link direction, and correspondingly configures a receiver of each link pair with the same time-frequency radio resource pattern to directionally monitor all possible sounding signals in its link directions. Thereby, receivers of all link pairs may be in a directional sensing state when their corresponding transmitters are sending directional sounding signals. In this way, the victim link pairs and the interfering link pairs can be accurately identified and the mutual interference levels can be measured. That is, an effective inter-link interference map (also referred to as Directional Link Interference Map, i.e. DLIM) of an MMW RAT network can be derived. Such measurement information can be used to enhance the resource allocation schemes, e.g., time, frequency and transmit power resource.

Figure 6:
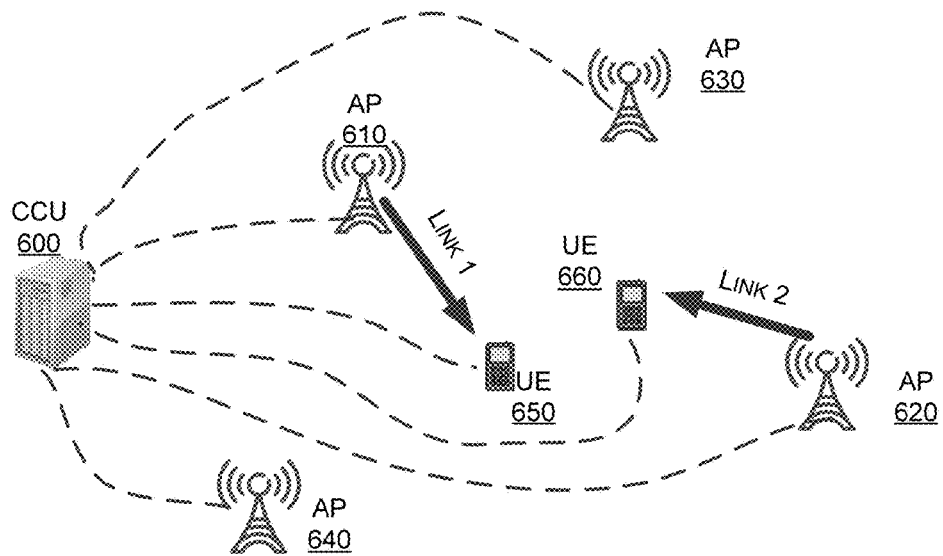
FIG. 6 depicts an example of a wireless communication network in which embodiments herein may be implemented.

FIG. 6 depicts an example of a wireless communication network in which ADSS may be implemented. The wireless communication network comprises a Central Control Unit (CCU) 600 and a plurality of radio nodes (also referred to as access nodes (ANs)) whereof six ANs are depicted in FIG. 6. The CCU 600 may be a Node B, a Base Station (BS), an eNB, an eNodeB, an Home Node B, an Home eNode B, a relay node, an AP or any other control node or network node at least responsible for parameter configurations and coordination among ANs as well as controlling radio links among ANs, in any wireless system or cellular network, such as an LTE network, any 3rd Generation Partnership Project (3GPP) cellular network, an MWV network, a Wimax network, a WLAN/Wi-Fi, a WPAN etc. Each radio node may e.g., be a wireless device, a mobile wireless terminal or a wireless terminal, a mobile phone, a computer such as a laptop, a Personal Digital Assistants (PDAs) or a tablet computer, sometimes referred to as a phablet, with wireless capability (the foregoing ones may be collectively known as a UE), a sensor or actuator with wireless capabilities or any other radio network units capable to communicate over a radio link in a wireless communication network. It should be noted that the term "radio node" or "AN" used in this document also covers other wireless devices such as Machine to Machine (M2M) devices, also denoted Machine Type Communication (MTC) devices. In this example, four ANs are exemplified as APs, i.e., AP 610, AP 620, AP 630, and AP 640, and two ANs are exemplified as UEs, i.e., UE 650 and UE 660. Furthermore, each AN can be regarded as either a transmitting node or a receiving node in different radio links. For example, in a link on which AP 610 transmits data to UE 650, AP 610 is a transmitting node, and UE 650 is a receiving node. In contrast, in a link on which AP 610 receives data from UE 650, AP 610 is a receiving node, and UE 650 is a transmitting node. To put it differently, a radio node or an AN may be either a client radio node or a serving radio node, depending on its role. For example, if a radio node is UE 660 as shown in FIG. 6, AP 620 serves its serving radio node. It is also possible that a UE may play a role of a serving radio node when the UE serves as a hot point and serves other UEs. In this case, the serving radio node is the UE, and client radio nodes may be other UEs served by the UE.

Figure 7:
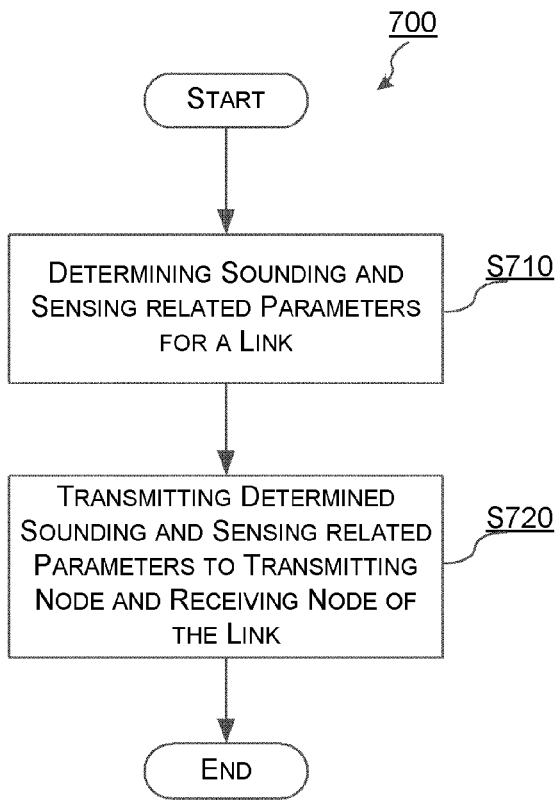
FIG. 7 shows a flowchart of a method 700 performed in a control node according to embodiments of the present disclosure.

FIG. 7 shows a flowchart of a method 700 performed in a control node, e.g., CCU 600 in FIG. 6, according to embodiments of the present disclosure. To be specific, the method 700 is used for implementing ADSS at network side.

At step S710, the control node determines sounding and sensing related parameters for a link, e.g., a radio link between AP 610 and UE 650 as shown in FIG. 6. The determined sounding and sensing related parameters include dedicated sounding and sensing related parameters for the link and common sounding and sensing related parameters for all links controlled by the control node. The common sounding and sensing related parameters include a sounding and sensing period and a sounding and sensing interval (i.e., a duration for sounding and sensing).

As a feasible implementation, the control node may determine the sounding and sensing related parameters upon receipt of a setup request for the link from, e.g., either end of the link, e.g., AP 610 or UE 650, etc.

At step S720, the control node transmits the determined sounding and sensing related parameters to a transmitting node and a receiving node of the link. For example, the transmitting node is AP 610 and the receiving node is UE 650, as shown in FIG. 6.

In an implementation, the common sounding and sensing related parameters may further include: a rule for the receiving node reporting its sensing result to the control node.

In another implementation, the dedicated sounding and sensing related parameters for the link may include a sounding resource parameter for specifying a sounding resource element for the transmitting node transmitting a sounding signal. The specified sounding resource element is in terms of at least one or more of: time, frequency, and code.

In another implementation, the method 700 may further include the following steps (not shown) of: receiving one or more sensing results from all receiving nodes of all links under control of the control node; determining a DLIM based on the received one or more sensing results; and determining a resource allocation scheme or a resource allocation strategy for data transmission in all links controlled by the control node based on the determined DLIM.

One major advantage with the method 700 is receiving nodes of all link pairs may be in a directional sensing state when the transmitting nodes of their neighboring links are sending directional sounding signals. This enables one link to identify all interfering links and measure the interference level from these interfering links, based on which the network can efficiently improve spatial reuse of frequency resources while avoiding and/or controlling collisions among different links.

Figure 8:
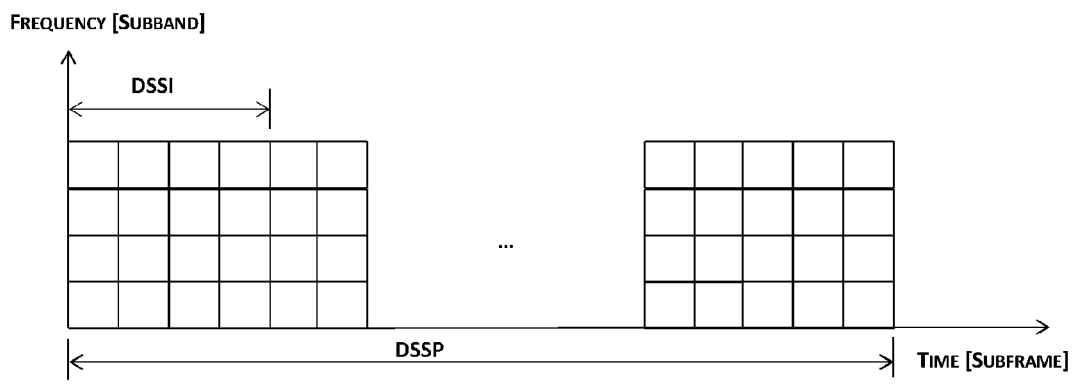
FIG. 8 illustrates a general sounding and sensing resource allocation structure according to embodiments of the present disclosure.

FIG. 8 illustrates a general sounding and sensing resource allocation structure according to embodiments of the present disclosure.

As shown in FIG. 8, Directional Sounding and Sensing Period (DSSP) denotes a sounding and sensing period, and Directional Sounding and Sensing Interval (DSSI) denotes a sounding and sensing interval, i.e., a window/a duration for sounding and sensing. The DSSP and DSSI are common sounding and sensing related parameters for all links controlled by the control node, and may be determined by the control node.

Figure 5:
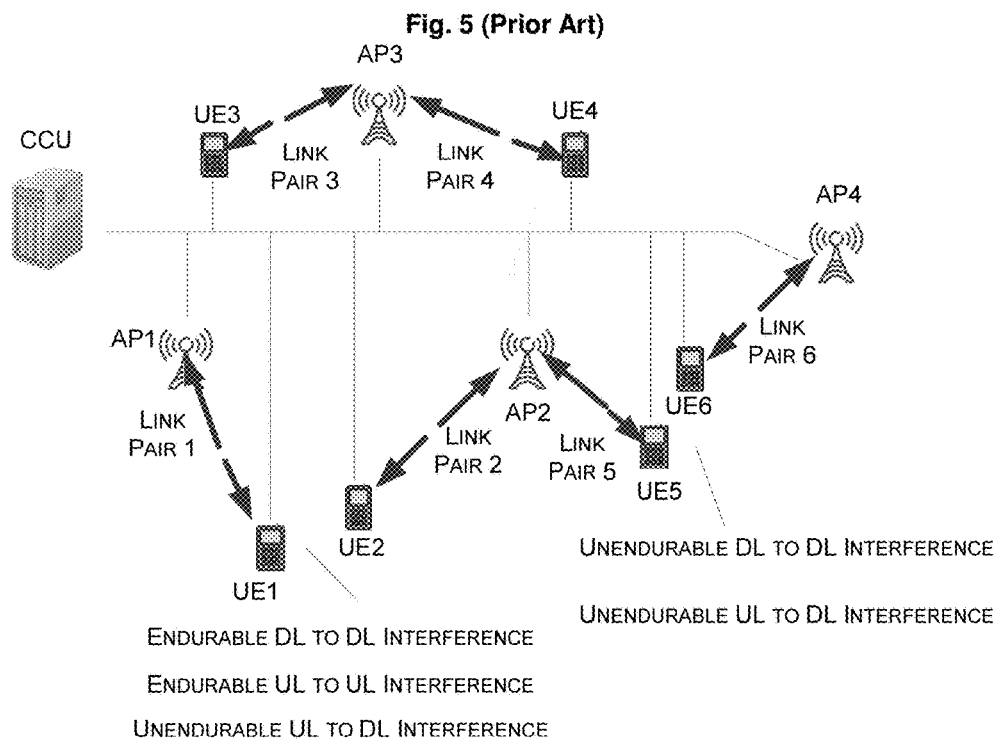
FIG. 5 illustrates an example of a complex interference situation in a MMW-RAT network.

The DSSP and DSSI are mainly in terms of time domain. For example, the DSSP and DSSI both refer to time windows. In this case, a transmitting node of each link may transmit a sounding signal to a receiving node of the link in a direction of the link during a time window defined by the DSSI, and the receiving node senses all sounding signals in a direct of the link during the same time window. Thereby, inter-link interferences, e.g., DL-DL interference between link 5 and link 6 as shown in FIG. 5, can be sensed in an efficient manner.

Optionally, the DSSP and DSSI may be further in terms of frequency domain. For example, the DSSI may further define one or more sub-bands to be used by the transmitting node/the receiving node of the link.

Within the DSSI, there are a number of sounding and sensing resource elements, some of which are allocated to a link for transmitting a sounding signal by means of dedicated sounding and sensing related parameters and thus are called as Sounding Resource Units (SRUs). One sounding and sensing resource element may be defined in terms of at least one or more of: time, frequency, and code. For example, one sounding and sensing resource element may be defined as one time-frequency resource unit plus an orthogonal sequence. This means that multiple sounding signals may be multiplexed over one time-frequency unit by using orthogonal sequences.

In practice, the DSSI length may be determined based on the link density in the network and the DSSP length may be short enough to track the TX/RX beam change of link pairs, including both TX/RX direction change and TX power change.

An exemplary DLIM may be described by referring to FIG. 5. As shown in FIG. 5, the DLIM can indicate the received sounding signal power from the transmitter of each link (Link i, e.g., any one of links 1-6 as shown in FIG. 5) and the received sounding signal strengths from other links whose sounding signals are detected by the link (Link i) receiver.

The DLIM may identify whether a transmitter of a first link contributes considerable interference to a receiver of a second link. If there is considerable interference contributed, the interference level and the corresponding link identity are included in the DLIM. Relying the sounding signals (SRU) and corresponding signal strengths reported from a receiver, the control node can identify the links and corresponding interference levels to the receiver.

For example, the DLIM may be updated upon receipt of a new directional sounding report from a receiver, or upon link setup/link release.

With such DLIM, the present disclosure can enhance the radio resource allocation (e.g. time, frequency and TX power resource), so that the spatial reuse can be efficiently and sufficiently improved.

Figure 9:
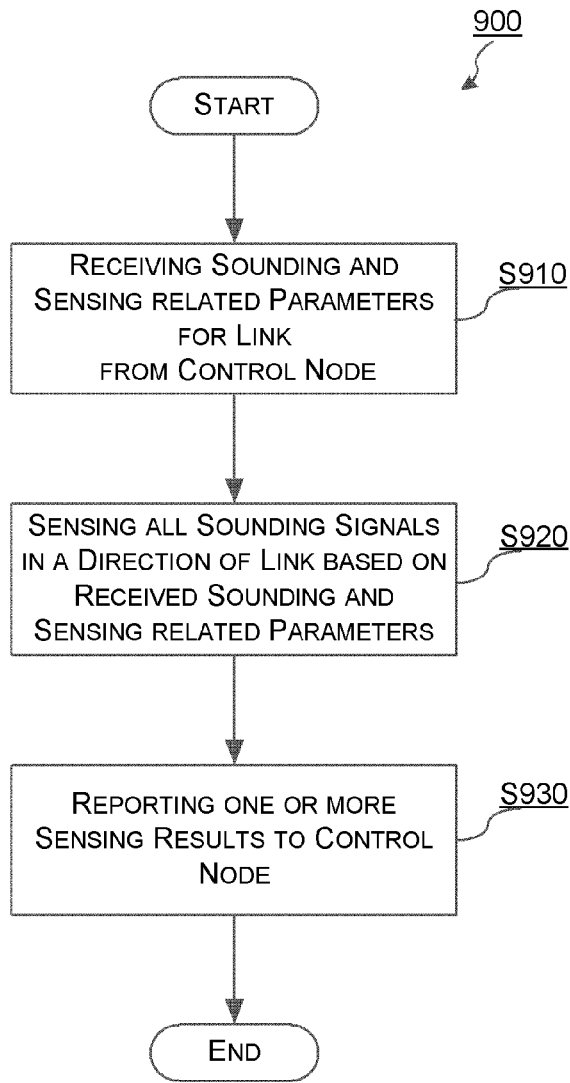
FIG. 9 shows a flowchart of a method 900 performed in a receiving node of a link according to embodiments of the present disclosure.

FIG. 9 shows a flowchart of a method 900 performed in a receiving node of a link, such as a radio link between AP 610 and UE 650 as shown in FIG. 6, according to embodiments of the present disclosure. To be specific, the method 900 is used for performing ADSS at receiving side. In this case, the receiving node may be AP 610 or UE 650. For illustration, UE 650 is taken as the receiving node here, and correspondingly AP 610 serves as a corresponding transmitting node for the receiving node, and vice versa.

At step S910, UE 650 receives sounding and sensing related parameters for the link from a control node, e.g., the CCU 600 in FIG. 6. The received sounding and sensing related parameters include dedicated sounding and sensing related parameters for the link and common sounding and sensing related parameters for all links controlled by the control node. The common sounding and sensing related parameters include a sounding and sensing period and a sounding and sensing interval.

At step S920, UE 650 senses all sounding signals in a direction of the link based on the received sounding and sensing related parameters.

At step S930, UE 650 reports one or more sensing results to the control node.

In an implementation, the common sounding and sensing related parameters further include: a rule for UE 650 reporting the one or more sensing results to the control node.

During the sounding interval, all receiving nodes shall be in blindly monitoring state in its link direction. Each receiving node shall target its RX beam in an incoming direction of its link. In order to leave some room for the RX beam adjustment during one sounding period, the RX beam for directional sensing could be wider than the RX beam for actual data receiving.

Via blind detection, the receiving node may determine information on SRU of the detected sounding signals. This information shall be reported to the control node for possible interfering transmitter identification. Moreover, the receiving node may further measure the strength of each detected sounding signal. This measurement result shall be reported to the CCU to derive the DLIM, which can be used to determine the maximum allowed TX power for a transmitter or interference coordination pattern in order to control the interference.

Figure 10:
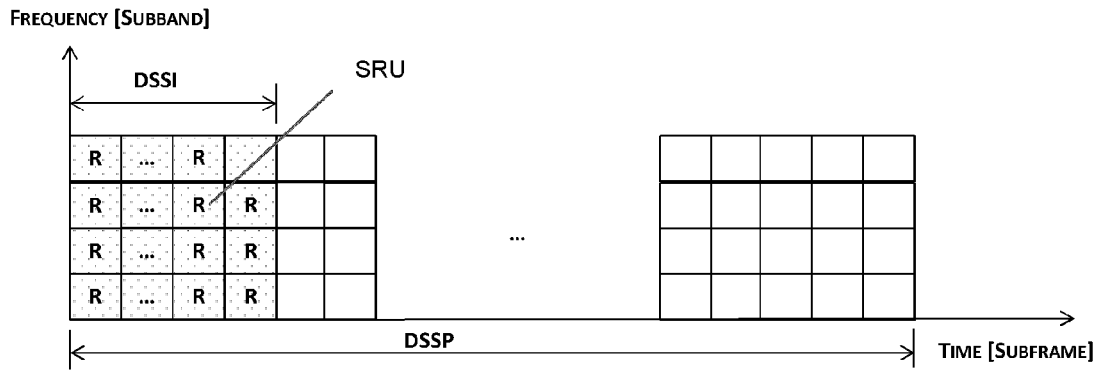
FIG. 10 illustrates an example sensing resource allocation structure according to embodiments of the present disclosure.

FIG. 10 illustrates an example sensing resource allocation structure according to embodiments of the present disclosure. As shown in FIG. 10, each receiving node may sense all possible sounding signals in its link direction over all SRUs during the DSSI.

One major advantage with the method 900 is that the receiving node can sense all sounding signals in a direction of the link in a time window during which the transmitting nodes of the neighboring links are transmitting sounding signals. When the method 900 is applied in two neighboring links, interference between these two links can be sensed in an efficient manner.

Figure 11:
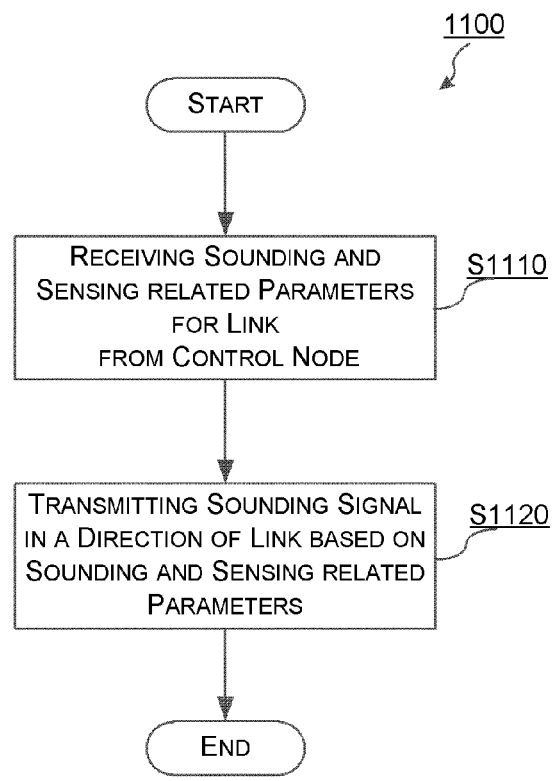
FIG. 11 shows a flowchart of a method 1100 performed in a transmitting node of a link according to embodiments of the present disclosure.

FIG. 11 shows a flowchart of a method 1100 performed in a transmitting node of a link, such as a radio link between AP 610 and UE 650 as shown in FIG. 6, according to embodiments of the present disclosure. To be specific, the method 900 is used for performing ADSS at transmitting side. In this case, the transmitting node may be AP 610 or UE 650. For illustration, AP 610 is taken as the transmitting node here, and correspondingly UE 650 serves as a corresponding receiving node for the transmitting node, and vice versa.

At step S1110, AP 610 receives sounding and sensing related parameters for the link from a control node, e.g., the CCU 600 as shown in FIG. 6. The received sounding and sensing related parameters include dedicated sounding and sensing related parameters for the link and common sounding and sensing related parameters for all links controlled by the control node. The common sounding and sensing related parameters include a sounding and sensing period and a sounding and sensing interval, e.g., DSSP and DSSI as shown in FIG. 8.

At step S1120, AP 610 transmits a sounding signal in a direction of the link based on the sounding and sensing related parameters.

In an implementation, the dedicated sounding and sensing related parameters for the link include a sounding resource parameter for specifying a sounding resource element for the transmitting node transmitting the sounding signal. The specified resource unit is in terms of at least one or more of: time, frequency and code.

Figure 12:
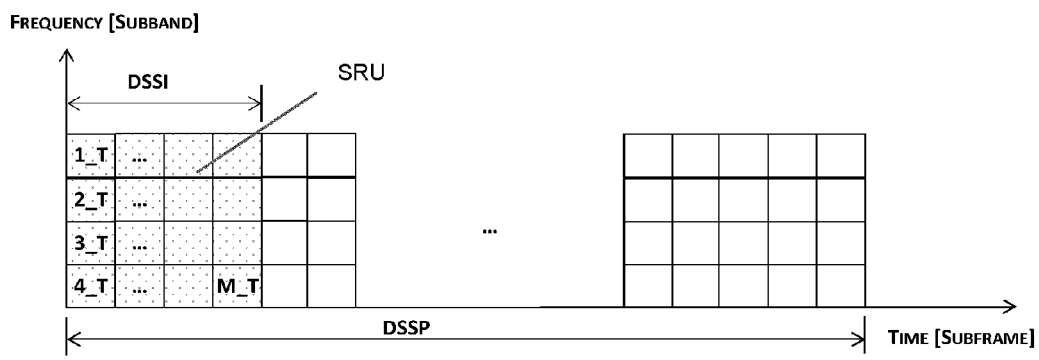
FIG. 12 illustrates an example sounding resource allocation structure according to embodiments of the present disclosure.

FIG. 12 illustrates an example sounding resource allocation structure according to embodiments of the present disclosure.

As shown in FIG. 12, each transmitting node may be allocated with one SRU, and there are totally M transmitters controlled by the control node, e.g., the CCU 600 as shown in FIG. 6. Optionally, each SRU may be also defined in terms of frequency. For example, each SRU may occupy one sub-band.

One major advantage with the method 1100 is that the transmitting node can transmit a sounding signal in a direction of the link in a time window during which the receiving nodes of itself and its neighboring links are sensing the sounding signal. When the method 1100 is applied in two neighboring links, interference between these two links can be sensed in an efficient manner.

In practice, one AN may serve multiple links (including access link and/or backhaul link), and act as transmitter and/or receiver. As one AN can be only in either TX or RX state no matter how many TX RF chains or RX RF chains it has. Due to this, when the AN is in TX state as a transmitter, it may miss monitoring of some SRUs during each DSSI as receiver for other links. That is, there is deafness problem in ADSS in case one node serves as both transmitter and receiver for different links. Moreover, for each AN which serves a receiver for a link, there should be one RX RF chain targeting in the link direction during each DSSI. When the number of served receiving links by one AN is larger than the number of RX RF chains of this AN, this AN cannot simultaneously process directional sensing for all served receiving links for which the AN serves as receivers during one DSSI due to lack of RX RF chains.

Aiming to such issues, the present disclosure further proposes to set a sounding and sensing related configuration for a radio node under control of one CCU according to network deployment of radio nodes under control of the CCU. To be specific, the present disclosure proposes to configure neighboring radio nodes under control of one CCU with different sounding and sensing related configurations.

First of all, a definition of Directional Sounding and Sensing Windows (DSSW) is introduced. Each DSSI as shown in e.g., FIG. 8 may be divided into one or more (preferably two or more in the present disclosure) DSSWs. Each DSSW may have a same or different number of sounding and sensing resource elements (e.g., each sounding and sensing resource element is indicated by the smallest resource grid in FIG. 8), which may be consecutive or non-consecutive.

Figure 13:
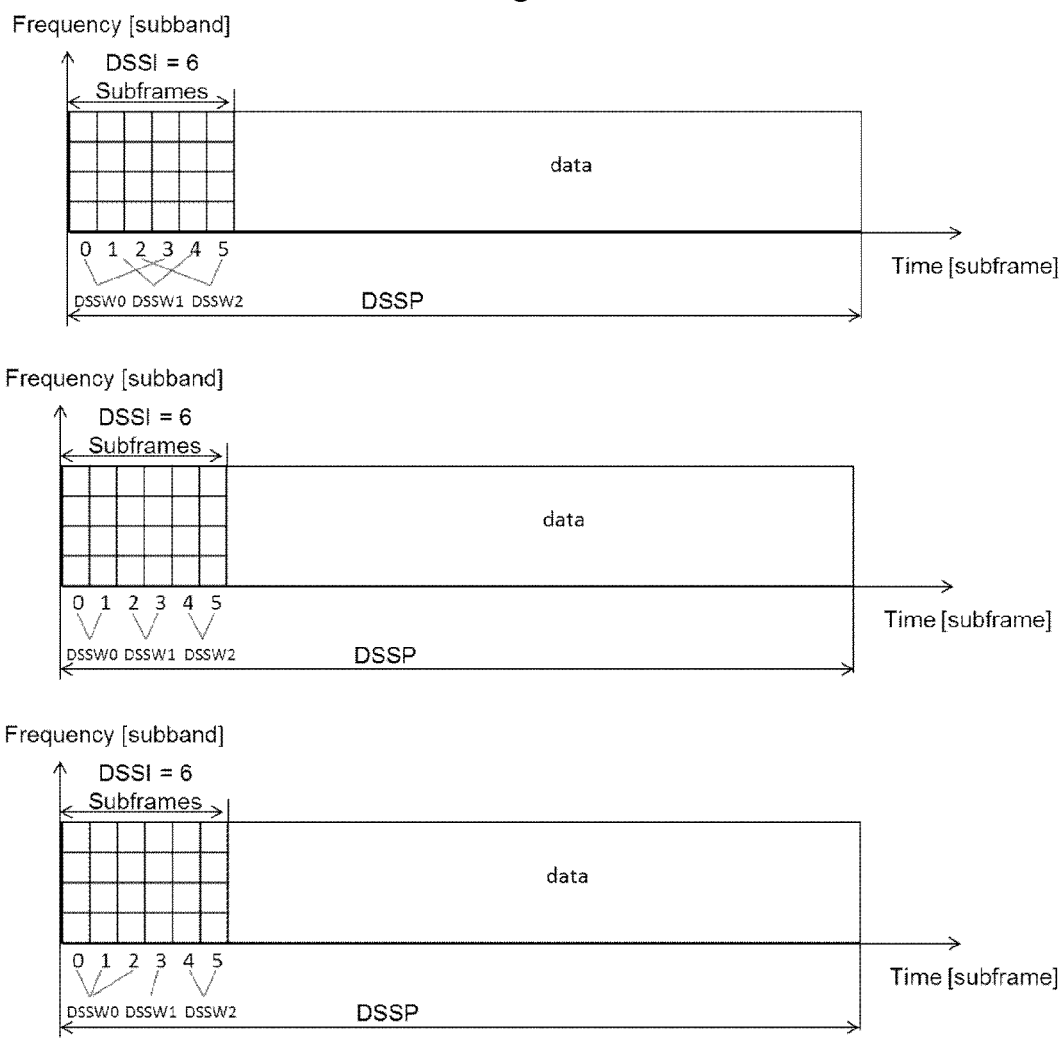
FIG. 13 illustrates three exemplary divisions of DSSI into DSSWs according to the present disclosure.

FIG. 13 illustrates three exemplary divisions of DSSI into DSSWs according to the present disclosure. In these three examples, a DSSI is divided into three DSSWs, i.e., DSSW0, DSSW1 and DSSW2. It would be appreciated that a DSSI may be also divided into more than or less than three DSSWs.

As illustrated in the upper and middle parts of FIG. 13, each DSSW is of an equal size, i.e., sounding and sensing resource elements in four sub-bands and two sub-frames. The difference between the upper part and the middle part lies in that sounding and sensing resource elements in the former are non-consecutive, and those in the latter are consecutive. In the lower part of FIG. 13, each DSSW has a different number of sounding and sensing resource elements (i.e., an unequal size of sounding and sensing resource elements). Although each DSSW as illustrated in FIG. 13 is formed of sounding and sensing resource elements on four sub-bands, it should be understood that a DSSW may be formed of any number of sounding and sensing resource elements as shown in FIG. 8. Hence, each DSSW per DSSI may be composed by equal/unequal sizes of consecutive/non-consecutive sounding and sensing resource elements.

According to the present disclosure, at least one DSSW of a DSSI may be allocated to one AN as directional sounding signal transmission window (referred to as Transmission DSSW, i.e., TDSSW), and the rest DSSWs may be allocated to all of the AN's neighboring ANs as Reception DSSW (RDSSW). In other words, the present disclosure proposes to configure neighboring ANs with different DSSI configurations (DSSI patterns), each of which is formed of at least one TDSSW and at least one RDSSW.

Figure 14:
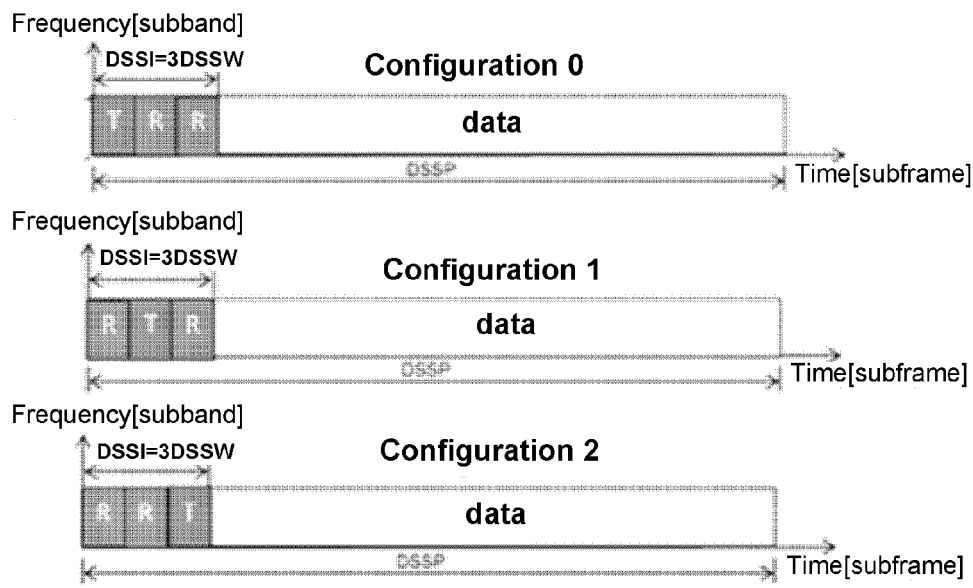
FIG. 14 shows three exemplary DSSI configurations according to the present disclosure.

FIG. 14 shows three exemplary DSSI configurations according to the present disclosure. As illustrated, there are three DSSI configurations, i.e., Configuration 0, Configuration 1 and Configuration 2, which can be allocated to three neighboring ANs, respectively. In each configuration, a DSSI is divided into three DSSWs, including one TDSSW and two RDSSWs. This is for illustration, and it would be appreciated that other appropriate configurations may be applicable.

As shown in FIG. 14, TDSSWs of Configurations 0, 1 and 2 are orthogonal to each other. That is, each sounding resource element involved in TDSSW of Configuration 0 is orthogonal to each sounding resource element involved in TDSSW of Configuration 1 or 2. The "orthogonal" here may refer to either time domain or frequency domain. For example, TDSSWs of Configurations 0, 1 and 2 may occur in separate subframes, but occupy the same sub-bands.

Alternatively, TDSSWs of Configurations 0, 1 and 2 may occur in separate sub-bands, but occupy the same subframes.

Figure 15:
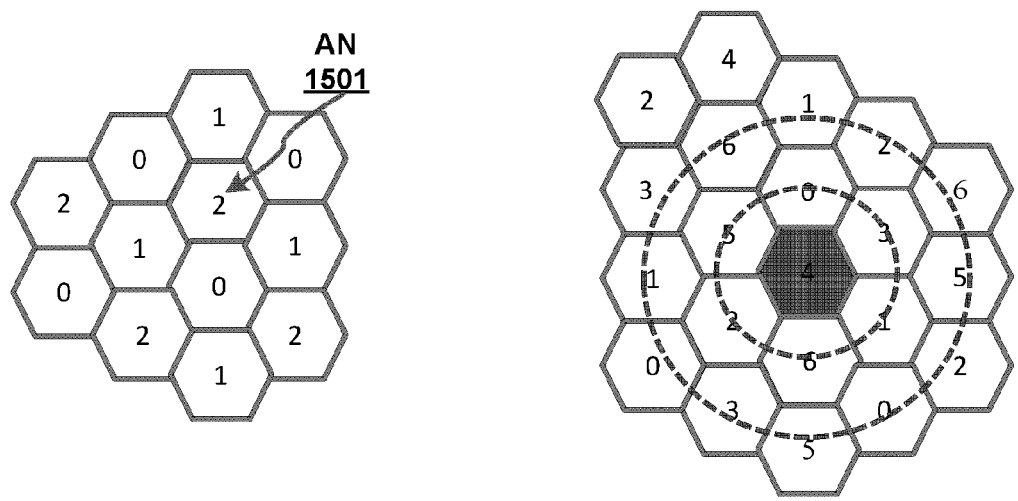
FIG. 15 illustrates two exemplary network deployments under control of a CCU according to the present disclosure.

FIG. 15 illustrates two exemplary network deployments under control of a CCU according to the present disclosure. According to the present disclosure, the CCU may determine a DSSI configuration for each AN under control of the CCU, and the AN in turn allocates sounding and sensing resource elements indicated by respective DSSI configuration to each link served by the AN.

It is assumed that each AN covers a hexagonal area. In the left part of FIG. 15, there are 3 different DSSI configurations (e.g., Configurations 0, 1 and 2 as shown in FIG. 14), and each AN can be configured with a different DSSI configuration than its neighboring ANs. Taking an AN covering an hexagonal area of FIG. 15 (denoted as AN 1501) as an example, Configuration 2 as shown in FIG. 14 is allocated to the AN, while its neighboring ANs are allocated with either Configuration 0 or Configuration 1. In this way, when AN 1501 is in TX state, all link receivers of its neighboring ANs are all in RX state.

In the right part of FIG. 15, there are 7 different DSSI configurations and each AN can be allocated with a different DSSI configuration than even more neighboring ANs. For instance, an AN with the shaded area may be allocated with DSSI configuration 4, while its neighboring ANs with hexagonal areas marked by two dotted cycles are allocated with other DSSI configurations.

It would be appreciated that any other appropriate network deployments other than those as shown in FIG. 15 may be applicable to the present disclosure.

Figure 16:
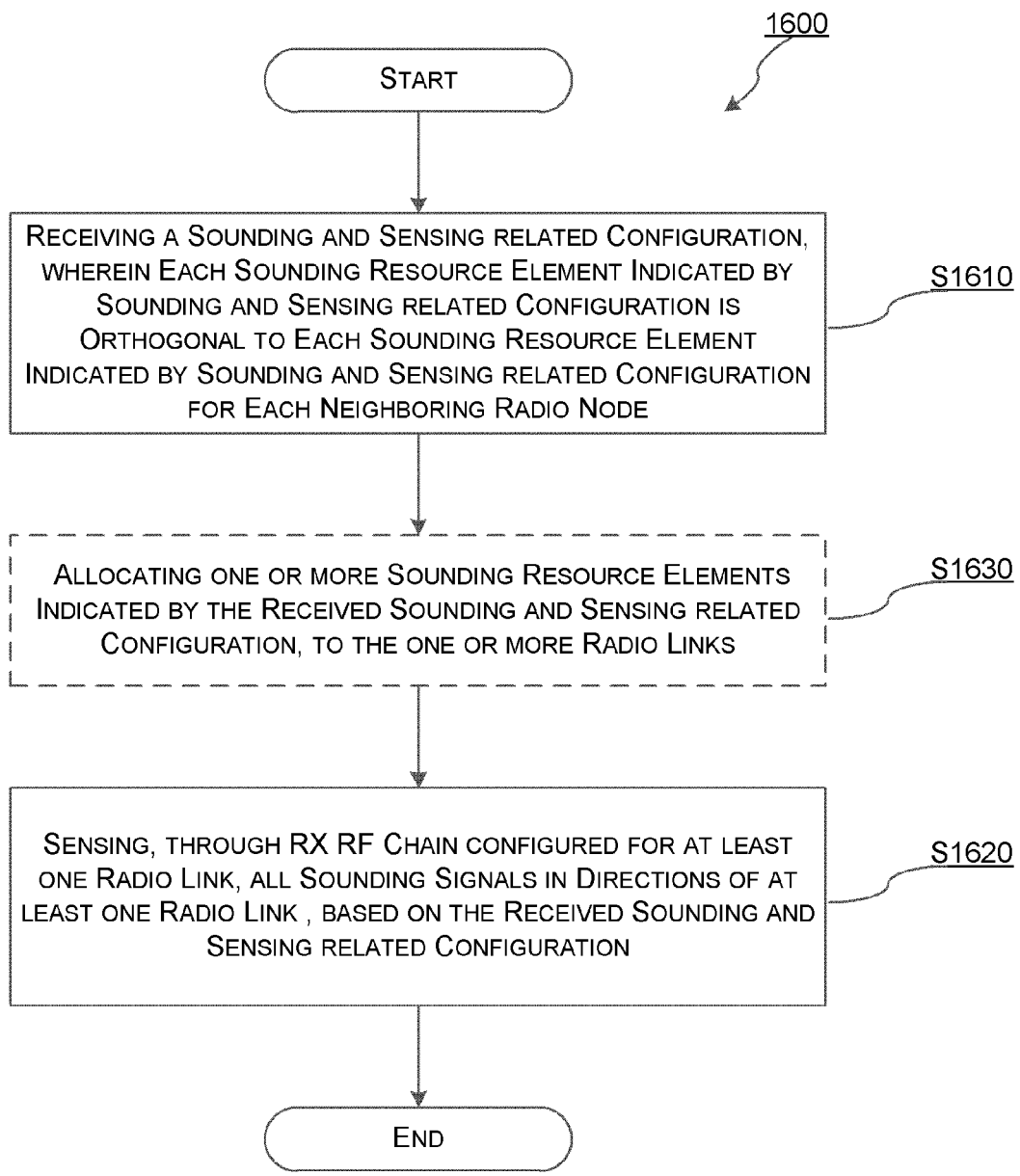
FIG. 16 shows a flowchart of a method 1600 used in a serving radio node according to embodiments of the present disclosure.

FIG. 16 shows a flowchart of a method 1600 used in a serving radio node, e.g., AP2 in FIG. 5, according to embodiments of the present disclosure. The serving radio node serves one or more client radio nodes which are connected to the serving radio node via one or more radio links, in a coverage area neighboring to one or more coverage areas served by one or more neighboring radio nodes in a wireless communication network such as a MMW RAT network. For example, AP 2 serves UE 2 and UE 5, UE 2 is connected to AP 2 via link pair 2, and UE 5 is connected to AP 2 via link pair 5. In this example, AP1, AP3 and AP4 may be neighboring radio nodes of AP2.

The method 1600 includes step S1610, at which the serving radio node receives, from a control node (e.g., the CCU in FIG. 5) controlling the serving radio node, a sounding and sensing related configuration for the serving radio node. For example, the sounding and sensing related configuration may be DSSI configurations as shown in FIG. 14. Each sounding resource element (i.e., SRU as shown in FIG. 8) indicated by the sounding and sensing related configuration is orthogonal to each sounding resource element indicated by a sounding and sensing related configuration for each neighboring radio node.

In an implementation, the received sounding and sensing related configuration indicates two or more sounding and sensing windows per sounding and sensing duration (i.e. DSSI), one or more sounding and sensing windows of which are configured as sensing windows for sensing by the serving radio node, and the remaining sounding and sensing windows of which are configured as sounding windows for sounding by the serving radio node.

The received sounding and sensing related configuration for the serving radio node may indicate two or more DSSWs per DSSI, as shown in FIG. 13. For example, the received sounding and sensing related configuration for the serving radio node may be Configuration 0 in FIG. 14, and the sounding and sensing related configuration for each neighboring radio node may be Configuration 1 or Configuration 2.

As an example of the implementation, the sounding windows for the serving radio node correspond, in time domain, to sensing windows for each neighboring radio node. In this way, when the serving radio node is transmitting a sounding signal in the sounding windows, each neighboring radio node should be sensing the sounding signal in the sensing windows. That is, when an AN is in TX state during DSSI, its neighboring link receivers are all in RX state.

As another example of the implementation, each sounding and sensing window has a same or different number of sounding and sensing resource elements, e.g., as shown in FIG. 13.

As a further example of the implementation, each sounding and sensing window has consecutive or non-consecutive sounding and sensing resource elements, e.g., as shown in FIG. 13.

The method 1600 further includes step S1620, at which the serving radio node senses, through a RX RF chain of the serving radio node configured for each radio link of the one or more radio links, all sounding signals in a direction of the radio link based on the received sounding and sensing related configuration.

In an implementation, the sensing at step S1620 may be performed in all sensing resource elements indicated by the received sounding and sensing related configuration. Alternatively, the sensing may be further performed in a part or all sounding resource elements indicated by the received sounding and sensing related configuration.

Optionally, the method 1600 may further include step S1630. At step S1630, the serving radio node allocates one or more sounding resource elements indicated by the received sounding and sensing related configuration, to the one or more radio links.

When the number of RX RF chains of the serving radio node is smaller than the number of all radio links for which the serving node serves as receivers, it is not possible to process directional sensing for all these links simultaneously in each DSSI.

In this case, the method 1600 may optionally include two additional steps of: adjusting a sensing period for each radio link of the one or more radio links based on the received sounding and sensing related configuration and one or more predefined parameters; and sensing, through a RX RF chain of the serving radio node configured for each radio link of the one or more radio links, all sounding signals in a direction of the radio link, based on the adjusted sensing period.

For example, the serving radio node may process directional sensing for some links every n-th (n is an integer and n>1) DSSI instead of each DSSI. That is, a sensing period for each of some links may be adjusted to be larger than one DSSP. Such links may be referred to as slow directional sensing links herein. However, the transmission of the directional sounding signal for all links can still be processed in each DSSI so that one or more neighboring links can monitor the interference situation. As a consequence, the slow directional sensing links are slower to follow the interference situation, but each link which carries the directional sounding can monitor the whole interference situation. The full DLIM can still be achieved at the cost that the experienced interferences of the slow directional sensing links are updated with a longer cycle.

Figure 17:
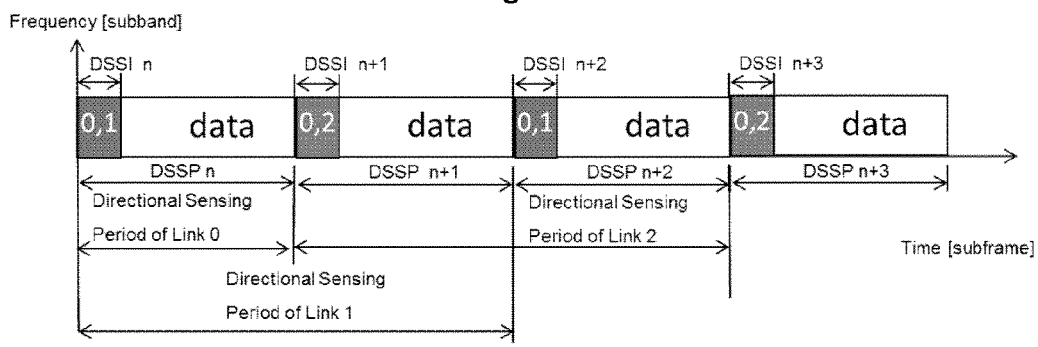
FIG. 17 illustrates an exemplary DSSI pattern according to embodiments of the present disclosure.

FIG. 17 illustrates an exemplary DSSI pattern according to embodiments of the present disclosure. It is assumed that the serving radio node has two RX RF chains, and there are three receiving links served by the serving radio node.

As shown in FIG. 17, the serving radio node may process directional sensing for the 1st receiving link (Link 0) every DSSI and every other DSSI for 2nd and 3rd links (Link 1 and 2). That is, sensing periods for Links 0, 1 and 2 are adjusted to be one DSSP, two DSSPs and two DSSPs, respectively. In this case, Link 0 may be referred to as regular directional sensing link while Link 1 and 2 may be referred to as slow directional sensing link.

When the number of receiving links by an AN decreases, the AN may adjust a slow directional sensing links to be a regular directional sensing link (i.e., directional sensing is processed every DSSI for the link).

According to some embodiments of the present disclosure, the one or more predefined parameters may include at least one of: a link radio quality; a link rate; or a link traffic priority.

As an example, the slow directional sensing links may be selected based on a link radio quality. For example, a link with a better radio quality, which can endure a higher interference, may be selected with relatively higher priority. Assume there are two neighboring links, and one link has a better radio link than the other link. In this case, the link with a better radio quality may be selected as a slow directional sensing link with a relatively higher priority, and thereby this link would be sensed less frequently than the other link, i.e., at a larger period.

As another example, the slow directional sensing links may be selected based on a link rate. For example, a link with a low required rate may be selected with relatively high priority.

As a yet another example, the slow directional sensing links may be selected based on a link traffic priority. For example, a link with a lower traffic priority may be selected with relatively higher priority.

Figure 18:
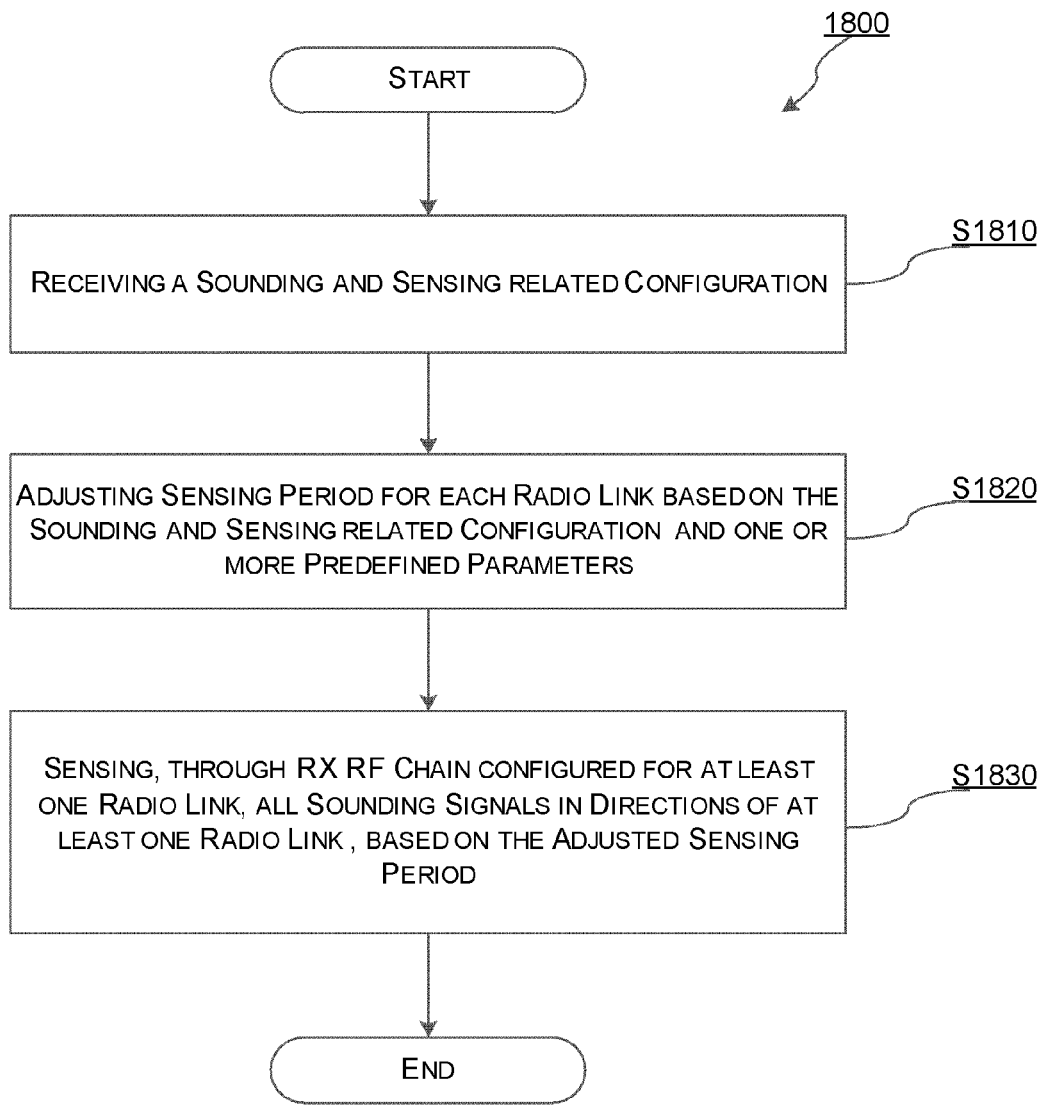
FIG. 18 shows a flowchart of a method 1800 used in a serving radio node according to embodiments of the present disclosure.

FIG. 18 shows a flowchart of a method 1800 used in a serving radio node according to embodiments of the present disclosure. The method 1800 is a feasible variant of the method 1600.

At step S1810, the serving radio node receives, from a control node (e.g., the CCU in FIG. 5) controlling the serving radio node, a sounding and sensing related configuration for the serving radio node. The sounding and sensing related configuration for the serving radio node may be determined by the control node as required, e.g., according to the detailed network deployment or radio environment. For example, the sounding and sensing related configuration for the serving radio node may be determined by the control node, in such a manner that each sounding resource element indicated by the sounding and sensing related configuration is orthogonal to each sounding resource element indicated by a sounding and sensing related configuration for each neighboring radio node.

At step S1820, the serving radio node adjusts a sensing period for each radio link of the one or more selected radio links based on the sounding and sensing related configuration and one or more predefined parameters, when the number of RX RF chains of the serving radio node is smaller than the number of the one or more radio links for which the serving node serves as receivers.

According to some embodiments of the present disclosure, the one or more predefined parameters may include at least one of: a link radio quality; a link rate; or a link traffic priority. For example, a link with a better radio quality, a lower link rate, or a lower traffic priority may be selected as a slow directional sensing link with a relatively higher priority, and thereby such a link would be sensed with a larger period. That is, a sensing period of such a link may be adjusted to be larger than one DSSP.

At step S1830, the serving radio node senses, through a RX RF chain of the serving radio node configured for each radio link of the one or more radio links, all sounding signals in a direction of the radio link, based on the adjusted sensing period. For example, the received sounding and sensing related configuration here may indicate the exemplary DSSI pattern as shown in FIG. 17.

Figure 19:
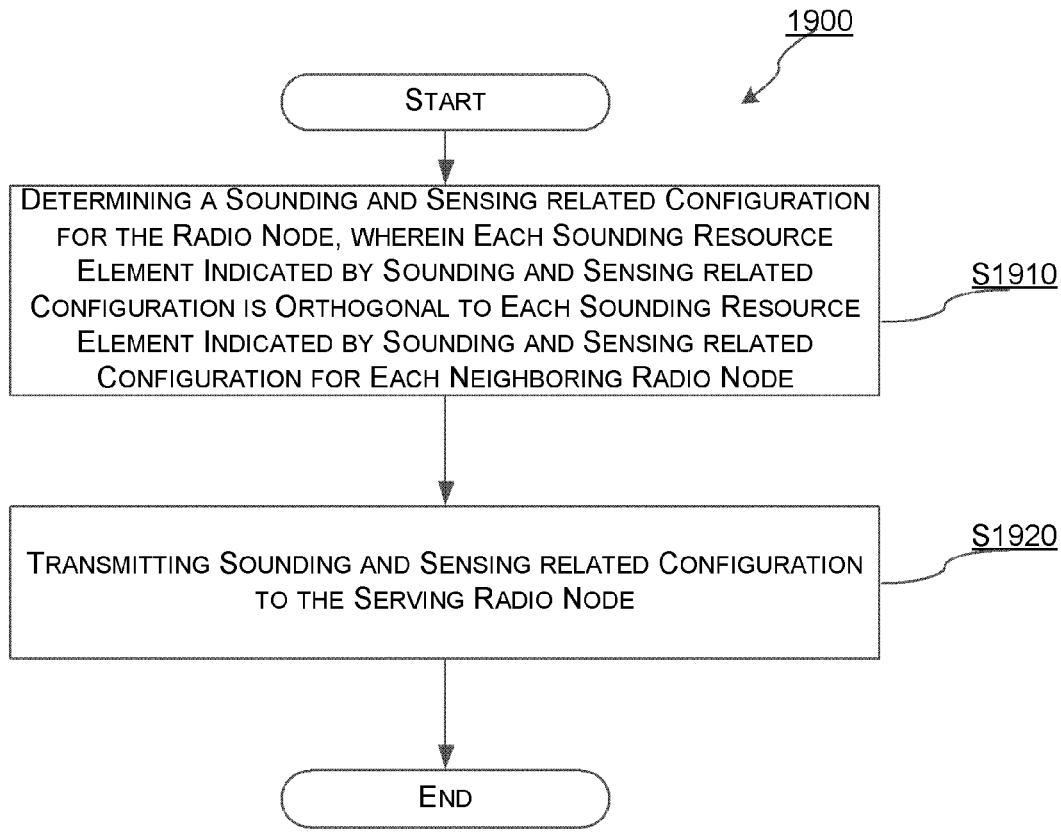
FIG. 19 shows a flowchart of a method 1900 used in a control node controlling a serving radio node according to embodiments of the present disclosure.

FIG. 19 shows a flowchart of a method 1900 used in a control node (e.g., CCU in FIG. 5) controlling a serving radio node (e.g., AP2 in FIG. 5) according to embodiments of the present disclosure. The serving radio node serves one or more client radio nodes which are connected to the serving radio node via one or more radio links, in a coverage area neighboring to one or more coverage areas served by one or more neighboring radio nodes in a wireless communication network such as a MMW RAT network. For example, AP 2 serves UE 2 and UE 5. UE 2 is connected to AP 2 via link pair 2, and UE 5 is connected to AP 2 via link pair 5. In this example, AP1, AP3 and AP4 may be neighboring radio nodes of AP2.

As shown in FIG. 19, the method 1900 includes steps S1910 and S1920. At step S1910, the control node determines a sounding and sensing related configuration for the serving radio node. The sounding resource element indicated by the sounding and sensing related configuration for the serving radio node is orthogonal to each sounding resource element indicated by a sounding and sensing related configuration for each neighboring radio node.

In an implementation, the determined sounding and sensing related configuration indicates two or more sounding and sensing windows per sounding and sensing duration, one or more sounding and sensing windows of which are configured as sensing windows for sensing by the serving radio node, and the remaining sounding and sensing windows of which are configured as sounding windows for sounding by the serving radio node.

For example, the control node may determine the sounding and sensing related configuration based on the network deployment. For example, the control node may allocate Configuration 2 to AN 1501 while Configuration 0 or Configuration 1 to AN 1501's neighboring ANs.

The determined sounding and sensing related configuration for the serving radio node may indicate two or more DSSWs per DSSI, as shown in FIG. 13. For example, the determined sounding and sensing related configuration for the serving radio node may be Configuration 0 in FIG. 14, and the sounding and sensing related configuration for each neighboring radio node may be Configuration 1 or Configuration 2.

As an example of the implementation, the sounding windows for the serving radio node correspond, in time domain, to sensing windows for each neighboring radio node. In this way, when the serving radio node is transmitting a sounding signal in the sounding windows, each neighboring radio node should be sensing the sounding signal in the sensing windows.

As another example of the implementation, each sounding and sensing window has a same or different number of sounding and sensing resource elements, e.g., as shown in FIG. 13.

As a further example of the implementation, each sounding and sensing window has consecutive or non-consecutive sounding and sensing resource elements, e.g., as shown in FIG. 13.

At step S1920, the control node transmits the determined sounding and sensing related configuration to the serving radio node. Then, the serving radio node may apply the sounding and sensing related configuration to each served link.

Figure 1:
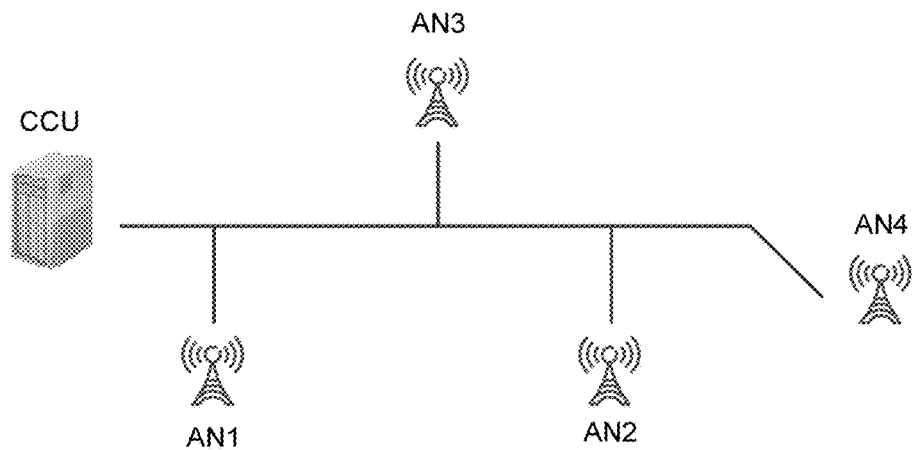
FIG. 1 schematically shows one example MMW RAT network.
Figure 2:
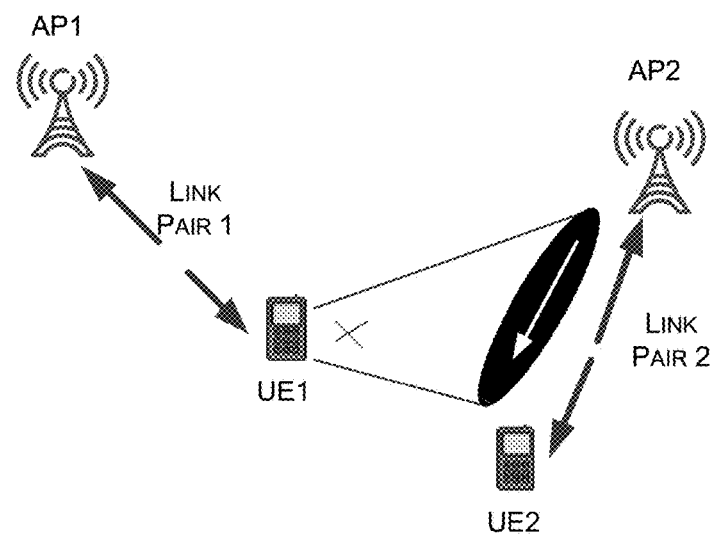
FIG. 2 illustrates an example of the hidden problem caused by directivity of high gain beam-forming.
Figure 3:
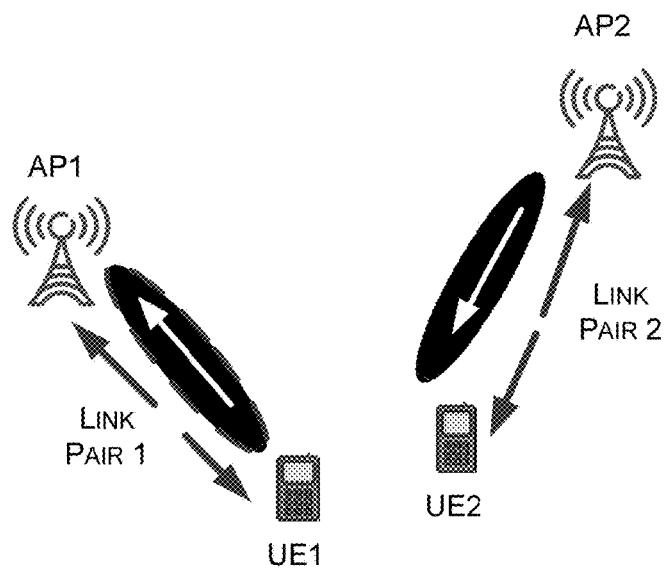
FIG. 3 illustrates an example of the deafness problem caused by directivity of high gain beam-forming.
Figure 4:
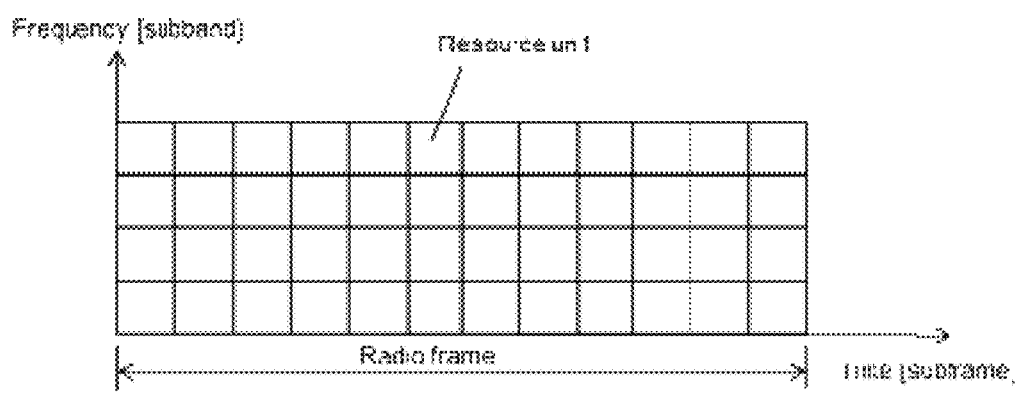
FIG. 4 illustrates one MMW-RAT carrier with 4 sub-bands.

One major advantage with such a configuration is that when the serving radio node is in TX state, all link receivers of its neighboring ANs are all in RX state. In this way, the deafness problem as illustrated in FIG. 3 can be conquered in an efficient manner.

Figure 20:
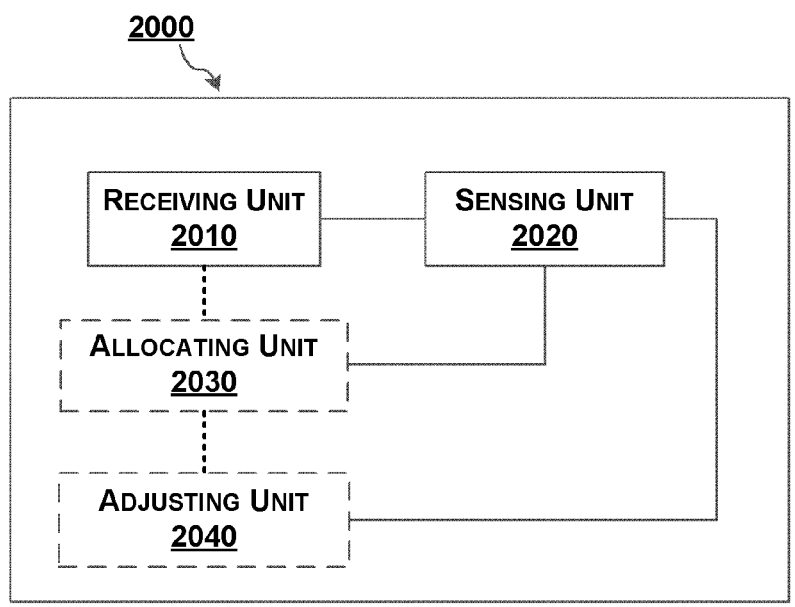
FIG. 20 is a schematic block diagram of a serving radio node 2000 according to the present disclosure.

FIG. 20 is a schematic block diagram of a serving radio node 2000 according to the present disclosure. The serving radio node 2000 serves one or more client radio nodes which are connected to the serving radio node via one or more radio links, in a coverage area neighboring to one or more coverage areas served by one or more neighboring radio nodes in a wireless communication network. For example, the serving radio node 2000 may be AP2 as shown in FIG. 5, which serves UE 2 and UE 5. UE 2 is connected to AP 2 via link pair 2, and UE 5 is connected to AP 2 via link pair 5. In this example, AP1, AP3 and AP4 may be neighboring radio nodes of AP2.

As shown in FIG. 20, the serving radio node 2000 includes a receiving unit 2010, a sensing unit 2020, an allocating unit 2030, and an adjusting unit 2040. The allocating unit 2030 and the adjusting unit 2040 are optional.

The receiving unit 2010 is configured to receive, from a control node (e.g., the CCU in FIG. 5) controlling the serving radio node, a sounding and sensing related configuration for the serving radio node. Each sounding resource element indicated by the sounding and sensing related configuration is orthogonal to each sounding resource element indicated by a sounding and sensing related configuration for each neighboring radio node.

In an implementation, the received sounding and sensing related configuration indicates two or more sounding and sensing windows per sounding and sensing duration, one or more sounding and sensing windows of which are configured as sensing windows for sensing by the serving radio node, and the remaining sounding and sensing windows of which are configured as sounding windows for sounding by the serving radio node.

The received sounding and sensing related configuration for the serving radio node may indicate two or more DSSWs per DSSI, as shown in FIG. 13. For example, the received sounding and sensing related configuration for the serving radio node may be Configuration 0 in FIG. 14, and the sounding and sensing related configuration for each neighboring radio node may be Configuration 1 or Configuration 2.

As an example of the implementation, the sounding windows for the serving radio node correspond, in time domain, to sensing windows for each neighboring radio node. In this way, when the serving radio node is transmitting a sounding signal in the sounding windows, each neighboring radio node should be sensing the sounding signal in the sensing windows. That is, when an AN is in TX state during DSSI, its neighboring link receivers are all in RX state.

As another example of the implementation, each sounding and sensing window has a same or different number of sounding and sensing resource elements, e.g., as shown in FIG. 13.

As a further example of the implementation, each sounding and sensing window has consecutive or non-consecutive sounding and sensing resource elements, e.g., as shown in FIG. 13.

The sensing unit 2020 is configured to sense, through a RX RF chain of the serving radio node configured for each radio link of the one or more radio links, all sounding signals in a direction of the radio link based on the received sounding and sensing related configuration.

In an implementation, the sensing unit 2020 is configured to perform the sensing in all sensing resource elements indicated by the received sounding and sensing related configuration. Alternatively, the sensing unit 2020 is configured to further perform the sensing in a part or all sounding resource elements indicated by the received sounding and sensing related configuration.

The allocating unit 2030 is configured to allocate one or more sounding resource elements indicated by the received sounding and sensing related configuration, to the one or more radio links.

The adjusting unit 2040 is further configured to adjust a sensing period for each radio link of the one or more radio links based on the received sounding and sensing related configuration and one or more predefined parameters, when the number of RX RF chains of the serving radio node is smaller than the number of all radio links for which the serving node serves as receivers. In this case, the sensing unit 2020 may be further configured to sense, through a RX RF chain of the serving radio node configured for each radio link of the one or more radio links, all sounding signals in a direction of the radio link, based on the adjusted sensing period.

For example, the received sounding and sensing related configuration here may indicate the exemplary DSSI pattern as shown in FIG. 17.

According to some embodiments of the present disclosure, the one or more predefined parameters may include at least one of: a link radio quality; a link rate; or a link traffic priority. For example, a sensing period for a link with a better radio quality, a lower link rate, or a lower traffic priority may be adjusted to be larger than one DSSP.

Figure 21:
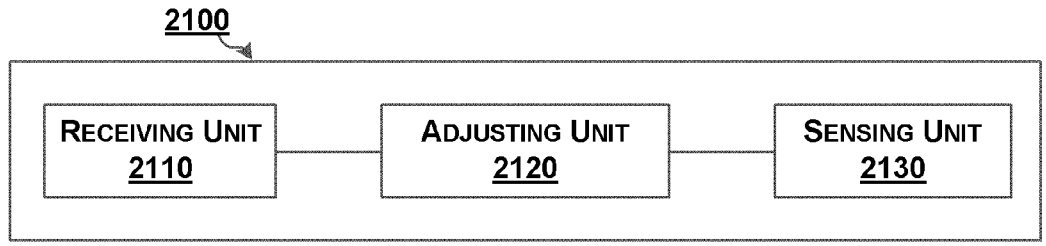
FIG. 21 shows a schematic block diagram of another serving radio node 2100 according to the present disclosure.

FIG. 21 shows a schematic block diagram of another serving radio node 2100 according to the present disclosure. The serving radio node 2100 here is a feasible variant of the serving radio node 2000.

As shown in FIG. 21, the serving radio node 2100 includes a receiving unit 2110, an adjusting unit 2120, and a sensing unit 2130. The adjusting unit 2120 operates like the adjusting unit 2040 in FIG. 20.

The receiving unit 2110 is configured to receive, from a control node (e.g., the CCU in FIG. 5) controlling the serving radio node, a sounding and sensing related configuration for the serving radio node. The sounding and sensing related configuration for the serving radio node may be determined by the control node as required, e.g., according to the detailed network deployment or radio environment. For example, the sounding and sensing related configuration for the serving radio node may be determined by the control node, in such a manner that each sounding resource element indicated by the sounding and sensing related configuration is orthogonal to each sounding resource element indicated by a sounding and sensing related configuration for each neighboring radio node.

The adjusting unit 2120 is configured to adjust a sensing period for each radio link of the one or more radio links based on the sounding and sensing related configuration and one or more predefined parameters, when the number of RX RF chains of the serving radio node is smaller than the number of the one or more radio links for which the serving node serves as receivers.

The sensing unit 2130 is configured to sense, through a RX RF chain of the serving radio node configured for each radio link of the one or more radio links, all sounding signals in a direction of the radio link, based on the adjusted sensing period. For example, the received sounding and sensing related configuration here may indicate the exemplary DSSI pattern as shown in FIG. 17.

According to some embodiments of the present disclosure, the one or more predefined parameters may include at least one of: a link radio quality; a link rate; or a link traffic priority. For example, a sensing period for a link with a better radio quality, a lower link rate, or a lower traffic priority may be adjusted to be larger than one DSSP.

Figure 22:
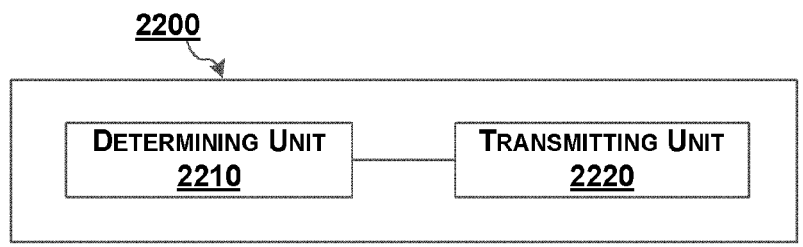
FIG. 22 is a schematic block diagram of a control node 2200 controlling a serving radio node according to embodiments of the present disclosure.

FIG. 22 is a schematic block diagram of a control node 2200 (e.g., CCU in FIG. 5) controlling a serving radio node (e.g., AP2 in FIG. 5) according to embodiments of the present disclosure. The serving radio node serves one or more client radio nodes which are connected to the serving radio node via one or more radio links, in a coverage area neighboring to one or more coverage areas served by one or more neighboring radio nodes in a wireless communication network such as a MMW RAT network. For example, AP 2 serves UE 2 and UE 5. UE 2 is connected to AP 2 via link pair 2, and UE 5 is connected to AP 2 via link pair 5. In this example, AP1, AP3 and AP4 may be neighboring radio nodes of AP2.

As shown in FIG. 22, the control node 2200 includes a determining unit 2210 and a transmitting unit 2220.

The determining unit 2210 is configured to determine a sounding and sensing related configuration for the serving radio node. The sounding resource element indicated by the sounding and sensing related configuration for the serving radio node is orthogonal to each sounding resource element indicated by a sounding and sensing related configuration for each neighboring radio node.

In an implementation, the determined sounding and sensing related configuration indicates two or more sounding and sensing windows per sounding and sensing duration, one or more sounding and sensing windows of which are configured as sensing windows for sensing by the serving radio node, and the remaining sounding and sensing windows of which are configured as sounding windows for sounding by the serving radio node.

For example, the control node 2200 may determine the sounding and sensing related configuration based on the network deployment. For example, the control node 2200 may allocate Configuration 2 to AN 1501 while Configuration 0 or Configuration 1 to AN 1501's neighboring ANs.

The determined sounding and sensing related configuration for the serving radio node may indicate two or more DSSWs per DSSI, as shown in FIG. 13. For example, the determined sounding and sensing related configuration for the serving radio node may be Configuration 0 in FIG. 14, and the sounding and sensing related configuration for each neighboring radio node may be Configuration 1 or Configuration 2.

As an example of the implementation, the sounding windows for the serving radio node correspond, in time domain, to sensing windows for each neighboring radio node. In this way, when the serving radio node is transmitting a sounding signal in the sounding windows, each neighboring radio node should be sensing the sounding signal in the sensing windows.

As another example of the implementation, each sounding and sensing window has a same or different number of sounding and sensing resource elements, e.g., as shown in FIG. 13.

As a further example of the implementation, each sounding and sensing window has consecutive or non-consecutive sounding and sensing resource elements, e.g., as shown in FIG. 13.

The transmitting unit 2220 is configured to transmit the determined sounding and sensing related configuration to the serving radio node. Then, the serving radio node may apply the sounding and sensing related configuration to each served link.

Figure 23:
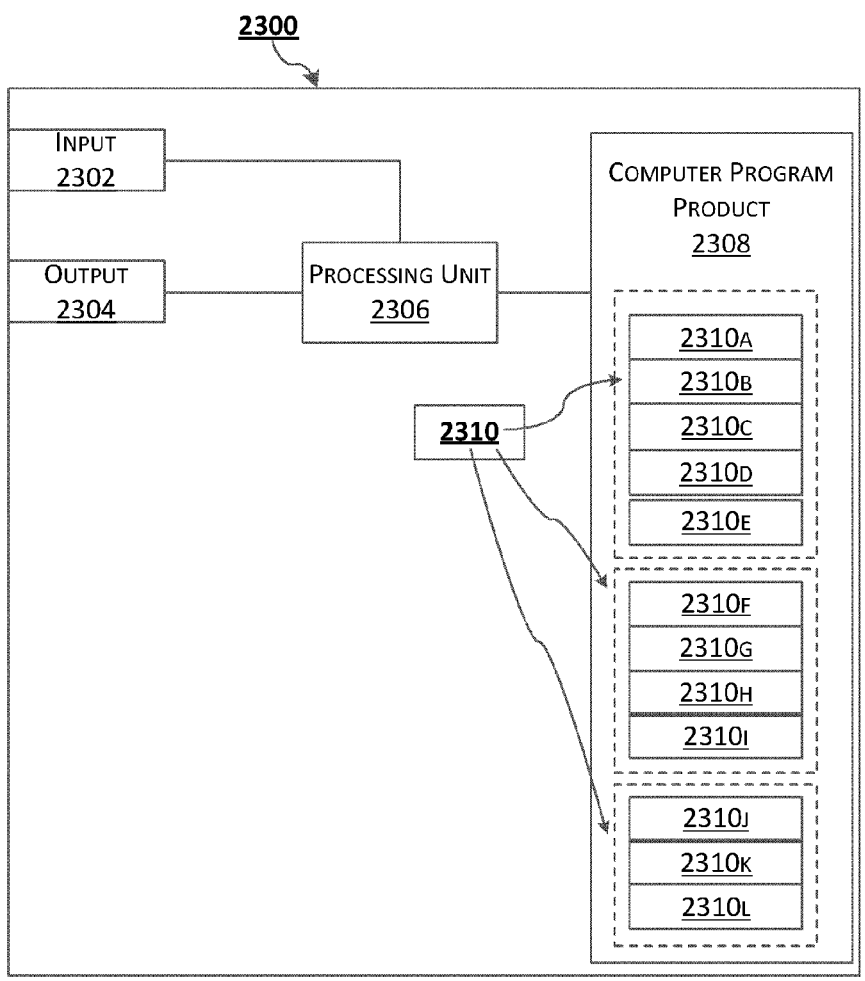
FIG. 23 schematically shows an embodiment of an arrangement 2300 which may be used in the serving radio node 2000, the serving radio node 2100, or the control node 2200 according to the present disclosure.

FIG. 23 schematically shows an embodiment of an arrangement 2300 which may be used in the serving radio node 2000, the serving radio node 2100, or the control node 2200 according to the present disclosure.

Comprised in the arrangement 2300 are here a processing unit 2306, e.g., with a Digital Signal Processor (DSP). The processing unit 2306 may be a single unit or a plurality of units to perform different actions of procedures described herein. The arrangement 2300 may also comprise an input unit 2302 for receiving signals from other entities, and an output unit 2304 for providing signal(s) to other entities. The input unit and the output unit may be arranged as an integrated entity or as illustrated in the example of FIG. 20, FIG. 21 or FIG. 22.

Furthermore, the arrangement 2300 may comprise at least one computer program product 2308 in the form of a non-volatile or volatile memory, e.g., an Electrically Erasable Programmable Read-Only Memory (EEPROM), a flash memory and a hard drive. The computer program product 2308 comprises a computer program 2310, which comprises code/computer readable instructions, which when executed by the processing unit 2306 in the arrangement 2300 causes the arrangement 2300 and/or the serving radio node or the control node in which it is comprised to perform the actions, e.g., of the procedure described earlier in conjunction with FIG. 16, FIG. 18 or FIG. 19.

The computer program 2310 may be configured as a computer program code structured in computer program modules 2310A-2310E, 2310F-2310I, or 2310J 2310L.

Hence, in an exemplifying embodiment when the arrangement 2300 is used in the serving radio node 2000, the code in the computer program of the arrangement 2300 includes a receiving module 2310A, for receiving, from a control node controlling the serving radio node, a sounding and sensing related configuration for the serving radio node. Each sounding resource element indicated by the sounding and sensing related configuration is orthogonal to each sounding resource element indicated by a sounding and sensing related configuration for each neighboring radio node. The code in the computer program 2310 further includes a sensing module 2310B, for sensing, through a RX RF chain of the serving radio node configured for each radio link of the one or more radio links, all sounding signals in a direction of the radio link based on the received sounding and sensing related configuration. Optionally, the code in the computer program 2310 further includes an allocating module 2310C, for allocating one or more sounding and sensing resource elements indicated by the received sounding and sensing related configuration, to the one or more radio links. Optionally, the code in the computer program 2310 further includes an adjusting module 2310D, for adjusting a sensing period for each radio link of the one or more radio links based on the received sounding and sensing related configuration and one or more predefined parameters, when the number of RX RF chains of the serving radio node is smaller than the number of all radio links for which the serving node serves as receivers. The code in the computer program 2310 may comprise further modules, illustrated as module 2310E, e.g. for controlling and performing other related procedures associated with the serving radio node's operations. For example, when the serving radio node is a BS, then the module 2310E may control and perform other related procedures associated with the BS's operations.

In another exemplifying embodiment when the arrangement 2300 is used in the serving radio node 2100, the code in the computer program of the arrangement 2300 includes a receiving module 2310F, for receiving, from a control node controlling the serving radio node, a sounding and sensing related configuration for the serving radio node. The code in the computer program further includes an adjusting module 2310G, for adjusting a sensing period for each radio link of the one or more radio links based on the sounding and sensing related configuration and one or more predefined parameters, when the number of RX RF chains of the serving radio node is smaller than the number of the one or more radio links for which the serving node serves as receivers. The code in the computer program further includes a sensing unit 2310H, for sensing, through a RX RF chain of the serving radio node configured for each radio link of the one or more radio links, all sounding signals in a direction of the radio link, based on the adjusted sensing period. The code in the computer program 2310 may comprise further modules, illustrated as module 2310I, e.g. for controlling and performing other related procedures associated with the serving radio node's operations. For example, when the serving radio node is a BS, then the module 2310I may control and perform other related procedures associated with the BS's operations.

In another exemplifying embodiment when the arrangement 2300 is used in the control node 2200, the code in the computer program of the arrangement 2300 includes a determining module 2310J, for determining a sounding and sensing related configuration for the serving radio node. The sounding resource element indicated by the sounding and sensing related configuration for the serving radio node is orthogonal to each sounding resource element indicated by a sounding and sensing related configuration for each neighboring radio node. The code in the computer program further includes a transmitting module 2310K, for transmitting the determined sounding and sensing related configuration to the serving radio node. The code in the computer program 2310 may comprise further modules, illustrated as module 2310L, e.g. for controlling and performing other related procedures associated with the control node's operations.

The computer program modules could essentially perform the actions of the flow illustrated in FIG. 16, to emulate the serving radio node 2000, or the actions of the flow illustrated in FIG. 18, to emulate the serving radio node 2100, or the actions of the flow illustrated in FIG. 19, to emulate the control node 2200. In other words, when the different computer program modules are executed in the processing unit 2306, they may correspond, e.g., to the units 2010-2040 of FIG. 20, or to the units 2110-2130 of FIG. 21, or to the units 2210-2220 of FIG. 22.

Although the code means in the embodiments disclosed above in conjunction with FIG. 23 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the serving radio node or the control node.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method used in a serving radio node, wherein the serving radio node serves one or more client radio nodes which are connected to the serving radio node via one or more radio links, in a coverage area neighboring to one or more coverage areas served by one or more neighboring radio nodes in a wireless communication network, the method comprising:
   receiving, from a control node controlling the serving radio node, a sounding and sensing related configuration for the serving radio node, wherein each sounding resource element indicated by the sounding and sensing related configuration is orthogonal to each sounding resource element indicated by a sounding and sensing related configuration for each neighboring radio node; and
   sensing, through a Receiver (RX) Radio Frequency (RF) chain of the serving radio node configured for each radio link of the one or more radio links, all sounding signals in a direction of the radio link based on the received sounding and sensing related configuration.

2. The method according to claim 1, wherein the received sounding and sensing related configuration indicates two or more sounding and sensing windows per sounding and sensing duration, one or more sounding and sensing windows of which are configured as sensing windows for sensing by the serving radio node, and the remaining sounding and sensing windows of which are configured as sounding windows for sounding by the serving radio node.

3. The method according to claim 2, wherein the sounding windows for the serving radio node correspond, in time domain, to sensing windows for each neighboring radio node.

4. The method according to claim 2, wherein each sounding and sensing window has a same or different number of sounding and sensing resource elements.

5. The method according to claim 2, wherein each sounding and sensing window has consecutive or non-consecutive sounding and sensing resource elements.

6. The method according to claim 1, further comprising:
allocating one or more sounding and sensing resource elements indicated by the received sounding and sensing related configuration, to the one or more radio links.

7. The method according to claim 1, wherein the sensing is performed in all sensing resource elements indicated by the received sounding and sensing related configuration.

8. The method according to claim 1, wherein the sensing is performed in a part or all sounding resource elements indicated by the received sounding and sensing related configuration.

9. The method according to claim 1, further comprising:
adjusting a sensing period for each radio link of the one or more radio links based on the received sounding and sensing related configuration and one or more predefined parameters, when a number of Receiver (RX) Radio Frequency (RF) chains of the serving radio node is smaller than a number of all radio links for which the serving radio node serves as receivers; and
sensing, through a RX RF chain of the serving radio node configured for each radio link of the one or more radio links, all sounding signals in a direction of the radio link, based on the adjusted sensing period.

10. The method according to claim 9, wherein the one or more predefined parameters include at least one of:
a link radio quality;
a link rate; or
a link traffic priority.

11. A method used in a control node controlling a serving radio node, wherein the serving radio node serves one or more client radio nodes which are connected to the serving radio node via one or more radio links, in a coverage area neighboring to one or more coverage areas served by one or more neighboring radio nodes in a wireless communication network, the method comprising:
determining a sounding and sensing related configuration for the serving radio node, wherein a sounding resource element indicated by the sounding and sensing related configuration for the serving radio node is orthogonal to each sounding resource element indicated by a sounding and sensing related configuration for each neighboring radio node; and
transmitting the determined sounding and sensing related configuration to the serving radio node.

12. The method according to claim 11, wherein the determined sounding and sensing related configuration indicates two or more sounding and sensing windows per sounding and sensing duration, one or more sounding and sensing windows of which are configured as sensing windows for sensing by the serving radio node, and the remaining sounding and sensing windows of which are configured as sounding windows for sounding by the serving radio node.

13. The method according to claim 12, wherein the sounding windows for the serving radio node correspond, in time domain, to sensing windows for each neighboring radio node.

14. The method according to claim 12, wherein each sounding and sensing window has a same or different number of sounding and sensing resource elements.

15. The method according to claim 12, wherein each sounding and sensing window has consecutive or non-consecutive sounding and sensing resource elements.

16. A serving radio node, which serves one or more client radio nodes which are connected to the serving radio node via one or more radio links, in a coverage area neighboring to one or more coverage areas served by one or more neighboring radio nodes in a wireless communication network, the serving radio node comprising:
a processor; and
a memory containing instructions which, when executed by the processor, cause the serving radio node to perform operations to:
receive, from a control node controlling the serving radio node, a sounding and sensing related configuration for the serving radio node, wherein each sounding resource element indicated by the sounding and sensing related configuration is orthogonal to each sounding resource element indicated by a sounding and sensing related configuration for each neighboring radio node; and
sense, through a Receiver (RX) Radio Frequency (RF) chain of the serving radio node configured for each radio link of the one or more radio links, all sounding signals in a direction of the radio link, based on the received sounding and sensing related configuration.

17. The serving radio node according to claim 16, wherein the received sounding and sensing related configuration indicates two or more sounding and sensing windows per sounding and sensing duration, one or more sounding and sensing windows of which are configured as sensing windows for sensing by the serving radio node, and the remaining sounding and sensing windows of which are configured as sounding windows for sounding by the serving radio node.

18. The serving radio node according to claim 17, wherein the sounding windows for the serving radio node correspond, in time domain, to sensing windows for each neighboring radio node.

19. The serving radio node according to claim 17, wherein each sounding and sensing window has a same or different number of sounding resource and sensing elements.

20. The serving radio node according to claim 17, wherein each sounding and sensing window has consecutive or non-consecutive sounding and sensing resource elements.

21. The serving radio node according to claim 16, wherein the instructions which, when executed by the processor, further cause the serving radio node to perform operations to:
allocate one or more sounding and sensing resource elements indicated by the received sounding and sensing related configuration, to the one or more radio links.

22. The serving radio node according to claim 16, wherein the instructions which, when executed by the processor, further cause the serving radio node to perform the sensing in all sensing resource elements indicated by the received sounding and sensing related configuration.

23. The serving radio node according to claim 16, wherein the instructions which, when executed by the processor, cause the serving radio node to perform the sensing in a part or all sounding resource elements indicated by the received sounding and sensing related configuration.

24. The serving radio node according to claim 16, wherein the instructions which, when executed by the processor, further cause the serving radio node to perform operations to:
adjust a sensing period for each radio link of the one or more radio links based on the received sounding and sensing related configuration and one or more predefined parameters, when a number of Receiver (RX)

Radio Frequency (RF) chains of the serving radio node is smaller than a number of all radio links for which the serving radio node serves as receivers, and wherein the instructions further cause the serving radio node to sense, through a RX RF chain of the serving radio node configured for each radio link of the one or more radio links, all sounding signals in a direction of the radio link, based on the adjusted sensing period.

25. The serving radio node according to claim 24, wherein the one or more predefined parameters include at least one of:
   a link radio quality;
   a link rate; or
   a link traffic priority.

26. A control node controlling a serving radio node, wherein the serving radio node serves one or more client radio nodes which are connected to the serving radio node via one or more radio links, in a coverage area neighboring to one or more coverage areas served by one or more neighboring radio nodes in a wireless communication network, the control node comprising:
   a processor; and
   a memory containing instructions which, when executed by the processor, cause the control node to perform operations to:
      determine a sounding and sensing related configuration for the serving radio node, wherein a sounding resource element indicated by the sounding and sensing related configuration for the serving radio node is orthogonal to each sounding resource element indicated by a sounding and sensing related configuration for each neighboring radio node; and
      transmit the determined sounding and sensing related configuration to the serving radio node.

27. The control node according to claim 26, wherein the determined sounding and sensing related configuration indicates two or more sounding and sensing windows per sounding and sensing duration, one or more sounding and sensing windows of which are configured as sensing windows for sensing by the serving radio node, and the remaining sounding and sensing windows of which are configured as sounding windows for sounding by the serving radio node.

28. The control node according to claim 27, wherein the sounding windows for the serving radio node correspond, in time domain, to sensing windows for each neighboring radio node.

29. The control node according to claim 27, wherein each sounding and sensing window has a same or different number of sounding and sensing resource elements.

30. The control node according to claim 27, wherein each sounding and sensing window has consecutive or non-consecutive sounding and sensing resource elements.

* * * * *

UNITED STATES PATENT AND TRADEMARK OFFICE
CERTIFICATE OF CORRECTION

PATENT NO. : 10,033,496 B2  
APPLICATION NO. : 15/028620  
DATED : July 24, 2018  
INVENTOR(S) : Liu Page 1 of 1

It is certified that error appears in the above-identified patent and that said Letters Patent is hereby corrected as shown below:

In the Specification

In Column 8, Line 8, delete "any 3rd" and insert -- a 3rd --, therefor.

In Column 10, Line 8, delete "sounding signals (SRU)" and insert -- sounding resource unit (SRU) --, therefor.

In the Claims

In Column 24, Line 57, in Claim 23, delete "cause" and insert -- further cause --, therefor.

Signed and Sealed this  
Twentieth Day of November, 2018

Andrei Iancu  
*Director of the United States Patent and Trademark Office*